United States Patent
Fenton et al.

(10) Patent No.: US 11,459,268 B2
(45) Date of Patent: Oct. 4, 2022

(54) TACTILE ELEMENTS FOR DEADFRONTED GLASS AND METHODS OF MAKING THE SAME

(71) Applicant: CORNING INCORPORATED, Corning, NY (US)

(72) Inventors: Matthew Wade Fenton, Elmira, NY (US); Yuhui Jin, Painted Post, NY (US); Timothy James Kiczenski, Corning, NY (US); Joshua Lee Tokar, Elmira, NY (US)

(73) Assignee: Corning Incorporated, Corning, NY (US)

( * ) Notice: Subject to any disclaimer, the term of this patent is extended or adjusted under 35 U.S.C. 154(b) by 327 days.

(21) Appl. No.: 16/646,732

(22) PCT Filed: Sep. 12, 2018

(86) PCT No.: PCT/US2018/050772
§ 371 (c)(1),
(2) Date: Mar. 12, 2020

(87) PCT Pub. No.: WO2019/055581
PCT Pub. Date: Mar. 21, 2019

(65) Prior Publication Data
US 2020/0299184 A1    Sep. 24, 2020

Related U.S. Application Data

(60) Provisional application No. 62/729,695, filed on Sep. 11, 2018, provisional application No. 62/679,278, (Continued)

(51) Int. Cl.
*C03C 17/34* (2006.01)
*C03C 19/00* (2006.01)
(Continued)

(52) U.S. Cl.
CPC .......... *C03C 17/001* (2013.01); *C03B 23/023* (2013.01); *C03C 3/078* (2013.01);
(Continued)

(58) Field of Classification Search
None
See application file for complete search history.

(56) References Cited

U.S. PATENT DOCUMENTS

| | | | |
|---|---|---|---|
| 2,068,030 A | 1/1937 | Lieser | |
| 2,608,030 A | 8/1952 | Jendrisak | |

(Continued)

FOREIGN PATENT DOCUMENTS

| | | | |
|---|---|---|---|
| CN | 1587132 A | 3/2005 | |
| CN | 1860081 A | 11/2006 | |

(Continued)

OTHER PUBLICATIONS

Chinese Patent Application No. 201880064270.5, Office Action dated Nov. 3, 2021, 20 pages (12 pages of English Translation and 8 pages of Original Copy), Chinese Patent Office.

(Continued)

*Primary Examiner* — David Sample
(74) *Attorney, Agent, or Firm* — Payal A. Patel; William M. Johnson

(57) ABSTRACT

Deadfront articles that include a tactile element formed on a first surface of a substrate and a visual element disposed on a second surface of the substrate opposite the first surface. The tactile element is positioned on the first surface of the substrate in a complimentary fashion to the visual element disposed on the second surface of the substrate. The tactile element may include a surface roughness portion having a surface roughness different than the surface roughness of an area bordering the surface roughness portion. The deadfront (Continued)

articles may be incorporated into an automobile interior to provide a visual and haptic display interface for a user.

19 Claims, 23 Drawing Sheets

Related U.S. Application Data filed on Jun. 1, 2018, provisional application No. 62/557,502, filed on Sep. 12, 2017.

(51) Int. Cl.

| | |
|---|---|
| C03C 15/00 | (2006.01) |
| C03C 17/00 | (2006.01) |
| C03B 23/023 | (2006.01) |
| C03C 3/078 | (2006.01) |
| C03C 3/083 | (2006.01) |
| C03C 3/089 | (2006.01) |
| C03C 3/091 | (2006.01) |
| C03C 17/38 | (2006.01) |
| G06F 3/01 | (2006.01) |
| G06F 3/041 | (2006.01) |
| C03C 21/00 | (2006.01) |

(52) U.S. Cl.
CPC .............. *C03C 3/083* (2013.01); *C03C 3/089* (2013.01); *C03C 3/091* (2013.01); *C03C 15/00* (2013.01); *C03C 17/3405* (2013.01); *C03C 17/38* (2013.01); *C03C 19/00* (2013.01); *G06F 3/016* (2013.01); *G06F 3/041* (2013.01); *C03C 21/002* (2013.01); *C03C 2204/08* (2013.01); *C03C 2217/485* (2013.01); *C03C 2217/72* (2013.01); *C03C 2217/77* (2013.01); *C03C 2217/90* (2013.01); *C03C 2218/151* (2013.01); *C03C 2218/365* (2013.01)

(56) References Cited

U.S. PATENT DOCUMENTS

| | | | |
|---|---|---|---|
| 3,197,903 | A | 8/1965 | Walley |
| 3,338,696 | A | 8/1967 | Dockerty |
| 3,582,456 | A | 6/1971 | Stolki |
| 3,682,609 | A | 8/1972 | Dockerty |
| 3,753,840 | A | 8/1973 | Plumat |
| 3,778,335 | A | 12/1973 | Boyd |
| 3,790,430 | A | 2/1974 | Mochel |
| 3,799,817 | A | 3/1974 | Laethem |
| 4,147,527 | A | 4/1979 | Bystrov et al. |
| 4,238,265 | A | 12/1980 | Deminet |
| 4,445,953 | A | 5/1984 | Hawk |
| 4,455,338 | A | 6/1984 | Henne |
| 4,859,636 | A | 8/1989 | Aratani et al. |
| 4,899,507 | A | 2/1990 | Mairlot |
| 4,969,966 | A | 11/1990 | Norman |
| 4,985,099 | A | 1/1991 | Mertens et al. |
| 5,108,480 | A | 4/1992 | Sugiyama |
| 5,154,117 | A | 10/1992 | Didelot et al. |
| 5,173,102 | A | 12/1992 | Weber et al. |
| 5,245,468 | A | 9/1993 | Demiryont et al. |
| 5,250,146 | A | 10/1993 | Horvath |
| 5,264,058 | A | 11/1993 | Hoagland et al. |
| 5,300,184 | A | 4/1994 | Masunaga |
| 5,711,119 | A | 1/1998 | Cornils et al. |
| 5,897,937 | A | 4/1999 | Cornils et al. |
| 6,044,662 | A | 4/2000 | Morin |
| 6,086,983 | A | 7/2000 | Yoshizawa |
| 6,101,748 | A | 8/2000 | Cass et al. |
| 6,212,805 | B1 | 4/2001 | Hill |
| 6,242,931 | B1 | 6/2001 | Hembree et al. |
| 6,265,054 | B1 | 7/2001 | Bravet et al. |
| 6,270,605 | B1 | 8/2001 | Doerfler |
| 6,274,219 | B1 | 8/2001 | Schuster et al. |
| 6,287,674 | B1 | 9/2001 | Verlinden et al. |
| 6,302,985 | B1 | 10/2001 | Takahashi et al. |
| 6,332,690 | B1 | 12/2001 | Murofushi |
| 6,387,515 | B1 | 5/2002 | Joret et al. |
| 6,420,800 | B1 | 7/2002 | Levesque et al. |
| 6,426,138 | B1 | 7/2002 | Narushima et al. |
| 6,582,799 | B1 | 6/2003 | Brown et al. |
| 6,620,365 | B1 | 9/2003 | Odoi et al. |
| 6,816,225 | B2 | 11/2004 | Colgan et al. |
| 6,903,871 | B2 | 6/2005 | Page |
| 7,297,040 | B2 | 11/2007 | Chang et al. |
| 7,375,782 | B2 | 5/2008 | Yamazaki et al. |
| 7,478,930 | B2 | 1/2009 | Choi |
| 7,489,303 | B1 | 2/2009 | Pryor |
| 7,542,302 | B1 | 6/2009 | Curnalia et al. |
| 7,750,821 | B1 | 7/2010 | Taborisskiy et al. |
| 7,955,470 | B2 | 6/2011 | Kapp et al. |
| 8,298,431 | B2 | 10/2012 | Chwu et al. |
| 8,344,369 | B2 | 1/2013 | Yamazaki et al. |
| 8,521,955 | B2 | 8/2013 | Arulambalam et al. |
| 8,549,885 | B2 | 10/2013 | Dannoux et al. |
| 8,586,492 | B2 | 11/2013 | Barefoot et al. |
| 8,652,978 | B2 | 2/2014 | Dejneka et al. |
| 8,692,787 | B2 | 4/2014 | Imazeki |
| 8,702,253 | B2 | 4/2014 | Lu et al. |
| 8,765,262 | B2 | 7/2014 | Michael |
| 8,814,372 | B2 | 8/2014 | Vandal et al. |
| 8,833,106 | B2 | 9/2014 | Dannoux et al. |
| 8,912,447 | B2 | 12/2014 | Leong et al. |
| 8,923,693 | B2 | 12/2014 | Yeates |
| 8,962,084 | B2 | 2/2015 | Brackley et al. |
| 8,967,834 | B2 | 3/2015 | Timmerman et al. |
| 8,969,226 | B2 | 3/2015 | Dejneka et al. |
| 8,978,418 | B2 | 3/2015 | Balduin et al. |
| 9,007,226 | B2 | 4/2015 | Chang |
| 9,061,934 | B2 | 6/2015 | Bisson et al. |
| 9,090,501 | B2 | 7/2015 | Okahata et al. |
| 9,109,881 | B2 | 8/2015 | Roussev et al. |
| 9,140,543 | B1 | 9/2015 | Allan et al. |
| 9,156,724 | B2 | 10/2015 | Gross |
| 9,223,162 | B2 | 12/2015 | Deforest et al. |
| 9,240,437 | B2 | 1/2016 | Shieh et al. |
| 9,278,500 | B2 | 3/2016 | Filipp |
| 9,278,655 | B2 | 3/2016 | Jones et al. |
| 9,290,413 | B2 | 3/2016 | Dejneka et al. |
| 9,346,703 | B2 | 5/2016 | Bookbinder et al. |
| 9,346,706 | B2 | 5/2016 | Bazemore et al. |
| 9,357,638 | B2 | 5/2016 | Lee et al. |
| 9,442,028 | B2 | 9/2016 | Roussev et al. |
| 9,446,723 | B2 | 9/2016 | Stepanski |
| 9,469,561 | B2 | 10/2016 | Kladias et al. |
| 9,517,967 | B2 | 12/2016 | Dejneka et al. |
| 9,573,843 | B2 | 2/2017 | Keegan et al. |
| 9,593,042 | B2 | 3/2017 | Hu et al. |
| 9,595,960 | B2 | 3/2017 | Wilford |
| 9,606,625 | B2 | 3/2017 | Levesque et al. |
| 9,617,180 | B2 | 4/2017 | Bookbinder et al. |
| 9,663,396 | B2 | 5/2017 | Miyasaka et al. |
| 9,694,570 | B2 | 7/2017 | Levasseur et al. |
| 9,700,985 | B2 | 7/2017 | Kashima et al. |
| 9,701,564 | B2 | 7/2017 | Bookbinder et al. |
| 9,720,450 | B2 | 8/2017 | Choi et al. |
| 9,724,727 | B2 | 8/2017 | Domey et al. |
| 9,802,485 | B2 | 10/2017 | Masuda et al. |
| 9,815,730 | B2 | 11/2017 | Marjanovic et al. |
| 9,821,509 | B2 | 11/2017 | Kastell |
| 9,895,975 | B2 | 2/2018 | Lee et al. |
| 9,902,640 | B2 | 2/2018 | Dannoux et al. |
| 9,931,817 | B2 | 4/2018 | Rickerl |
| 9,933,820 | B2 | 4/2018 | Helot et al. |
| 9,947,882 | B2 | 4/2018 | Zhang et al. |
| 9,955,602 | B2 | 4/2018 | Wildner et al. |
| 9,957,190 | B2 | 5/2018 | Finkeldey et al. |
| 9,963,374 | B2 | 5/2018 | Jouanno et al. |
| 9,972,645 | B2 | 5/2018 | Kim |
| 9,975,801 | B2 | 5/2018 | Maschmeyer et al. |
| 9,992,888 | B2 | 6/2018 | Moon et al. |
| 10,005,246 | B2 | 6/2018 | Stepanski |

(56) References Cited

U.S. PATENT DOCUMENTS

| | | |
|---|---|---|
| 10,017,033 B2 | 7/2018 | Fisher et al. |
| 10,042,391 B2 | 8/2018 | Yun et al. |
| 10,074,824 B2 | 9/2018 | Han et al. |
| 10,086,762 B2 | 10/2018 | Uhm |
| 10,131,118 B2 | 11/2018 | Kang et al. |
| 10,140,018 B2 | 11/2018 | Kim et al. |
| 10,153,337 B2 | 12/2018 | Lee et al. |
| 10,175,802 B2 | 1/2019 | Boggs et al. |
| 10,211,416 B2 | 2/2019 | Jin et al. |
| 10,222,825 B2 | 3/2019 | Wang et al. |
| 10,273,184 B2 | 4/2019 | Garner et al. |
| 10,303,223 B2 | 5/2019 | Park et al. |
| 10,303,315 B2 | 5/2019 | Jeong et al. |
| 10,326,101 B2 | 6/2019 | Oh et al. |
| 10,328,865 B2 | 6/2019 | Jung |
| 10,343,377 B2 | 7/2019 | Levasseur et al. |
| 10,347,700 B2 | 7/2019 | Yang et al. |
| 10,377,656 B2 | 8/2019 | Dannoux et al. |
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |
| 10,606,395 B2 | 3/2020 | Boggs et al. |
| 10,649,267 B2 | 5/2020 | Tuan et al. |
| 10,788,707 B2 | 9/2020 | Ai et al. |
| 10,976,607 B2 | 4/2021 | Huang et al. |
| 2002/0039229 A1 | 4/2002 | Hirose et al. |
| 2003/0031842 A1 | 2/2003 | Marietti et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Parton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0096937 A1 | 4/2009 | Bauer et al. |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2011/0057465 A1 | 3/2011 | Beau et al. |
| 2011/0148267 A1 | 6/2011 | McDaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1 | 8/2014 | Immerman et al. |
| 2014/0308464 A1 | 10/2014 | Levasseur et al. |
| 2014/0312518 A1 | 10/2014 | Levasseur et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1* | 3/2016 | Yang ............... G02F 1/133305 361/679.01 |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0334094 A1 | 11/2016 | Bach et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | McFarland |
| 2017/0213872 A1 | 7/2017 | Jinbo et al. |
| 2017/0217290 A1 | 8/2017 | Yoshizumi et al. |

(56) References Cited

U.S. PATENT DOCUMENTS

| | | |
|---|---|---|
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0329182 A1* | 11/2017 | Privitera ............ G02F 1/133504 |
| 2017/0334770 A1 | 11/2017 | Luzzato et al. |
| 2017/0349473 A1 | 12/2017 | Moriya et al. |
| 2018/0009197 A1 | 1/2018 | Gross et al. |
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0069053 A1 | 3/2018 | Bok |
| 2018/0072022 A1 | 3/2018 | Tsai et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Helot |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0245125 A1 | 8/2018 | Tsai et al. |
| 2018/0304825 A1 | 10/2018 | Mattelet et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |
| 2019/0039935 A1 | 2/2019 | Couillard et al. |
| 2019/0069451 A1 | 2/2019 | Myers et al. |
| 2019/0077337 A1 | 3/2019 | Gervelmeyer |
| 2019/0152831 A1 | 5/2019 | An et al. |
| 2019/0223309 A1 | 7/2019 | Amin et al. |
| 2019/0295494 A1 | 9/2019 | Wang et al. |
| 2019/0315648 A1 | 10/2019 | Kumar et al. |
| 2019/0329531 A1 | 10/2019 | Brennan et al. |
| 2020/0064535 A1 | 2/2020 | Haan et al. |
| 2020/0301192 A1 | 9/2020 | Huang et al. |
| 2021/0055599 A1 | 2/2021 | Chen et al. |

FOREIGN PATENT DOCUMENTS

| | | |
|---|---|---|
| CN | 101600846 A | 12/2009 |
| CN | 101684032 A | 3/2010 |
| CN | 101754865 A | 6/2010 |
| CN | 201989544 U | 9/2011 |
| CN | 102341356 A | 2/2012 |
| CN | 102464456 A | 5/2012 |
| CN | 103136490 A | 6/2013 |
| CN | 103587161 A | 2/2014 |
| CN | 203825589 U | 9/2014 |
| CN | 204111583 U | 1/2015 |
| CN | 104395949 A | 3/2015 |
| CN | 102566841 B | 4/2015 |
| CN | 104516562 A | 4/2015 |
| CN | 104656999 A | 5/2015 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3426614 A1 | 1/2019 |
| EP | 3532442 A1 | 9/2019 |
| FR | 2750075 A1 | 12/1997 |
| FR | 2918411 B1 | 10/2013 |
| FR | 3012073 A1 | 4/2015 |
| GB | 0805770 A | 12/1958 |
| GB | 0991867 A | 5/1965 |
| GB | 1319846 A | 6/1973 |
| GB | 2011316 A | 7/1979 |
| GB | 2281542 A | 3/1995 |
| JP | 55-154329 | 12/1980 |
| JP | 57-048082 A | 3/1982 |
| JP | 58-073681 A | 5/1983 |
| JP | 58-194751 | 11/1983 |
| JP | 59-076561 A | 5/1984 |
| JP | 63-089317 A | 4/1988 |
| JP | 63-190730 | 8/1988 |
| JP | 03-059337 U | 6/1991 |
| JP | 3059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |
| JP | 11-001349 A | 1/1999 |
| JP | 11-006029 A | 1/1999 |
| JP | 11-060293 A | 3/1999 |
| JP | 2000-260330 A | 9/2000 |
| JP | 2002-255574 A | 9/2002 |
| JP | 2003-500260 A | 1/2003 |

(56) References Cited

FOREIGN PATENT DOCUMENTS

| | | |
|---|---|---|
| JP | 2003-276571 A | 10/2003 |
| JP | 2003281959 A * | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2007-188035 A | 7/2007 |
| JP | 2007-197288 A | 8/2007 |
| JP | 2010-145731 A | 7/2010 |
| JP | 2012-111661 A | 6/2012 |
| JP | 2013-084269 A | 5/2013 |
| JP | 2014-126564 A | 7/2014 |
| JP | 2015-502901 A | 1/2015 |
| JP | 2015092422 A | 5/2015 |
| JP | 5748082 B2 | 7/2015 |
| JP | 5796561 B2 | 10/2015 |
| JP | 2016-500458 A | 1/2016 |
| JP | 2016031696 A | 3/2016 |
| JP | 2016-517380 A | 6/2016 |
| JP | 2016-130810 A | 7/2016 |
| JP | 2016-144008 A | 8/2016 |
| JP | 05976561 B2 | 8/2016 |
| JP | 2016-530204 A | 9/2016 |
| JP | 2016173794 A | 9/2016 |
| JP | 2016-207200 A | 12/2016 |
| JP | 2016203609 A | 12/2016 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201438895 A | 10/2014 |
| TW | 201546006 A | 12/2015 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 9801649 A1 | 1/1998 |
| WO | 00/73062 A1 | 12/2000 |
| WO | 2006/095005 A1 | 9/2006 |
| WO | 2007108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/175106 A2 | 11/2013 |
| WO | 2013174715 A1 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/202605 A1 | 12/2016 |
| WO | 2016196531 A1 | 12/2016 |
| WO | 2016196546 A1 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/158031 A1 | 9/2017 |
| WO | 2017155932 A1 | 9/2017 |
| WO | 2018/015392 A1 | 1/2018 |
| WO | 2018005646 A1 | 1/2018 |
| WO | 2018009504 A1 | 1/2018 |
| WO | 2018075853 A1 | 4/2018 |
| WO | 2018081068 A1 | 5/2018 |
| WO | 2018/102332 A1 | 6/2018 |
| WO | 2018125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055652 A1 | 3/2019 |
| WO | 2019055469 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

Author Unknown; "Stress Optics Laboratory Practice Guide" 2012; 11 Pages.

Belis et al; "Cold Bending of Laminated Glass Panels"; Heron vol. 52 (2007) No. 1/2; 24 Pages.

Doyle et al; "Manual on Experimental Stress Analysis"; Fifth Edition, Society for Experimental Mechanics; 31 Pages.

Elziere; "Laminated Glass: Dynamic Rupture of Adhesion"; Polymers; Universite Pierre et Marie Curie—Paris VI, 2016. English; 181 Pages.

Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.

Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.

Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.

Fildhuth et al; "Recovery Behaviour of Laminated Cold Bent Glass—Numerical Analysis and Testing"; Challenging Glass 4 & Cost Action TU0905 Final Conference—Louter, Bos & Beus (Eds) (2014); 9 Pages.

(56) References Cited

OTHER PUBLICATIONS

Fildhuth; "Design and Monitoring of Cold Bent Lamination—Stabilised Glass"; ITKE 39 (2015) 270 Pages.
Galuppi et al; "Cold-Lamination-Bending of Glass: Sinusoidal Is Better Than Circular", Composites Part B, 79, 2015, pp. 285-300.
Galuppi et al; "Optical Cold Bending of Laminated Glass"; International Journal of Solids And Structures, vol. 67-68, 2015, pp. 231-243.
Millard; "Bending Glass In The Parametric Age", ENCLOS, 2015, pp. 1-6; http://www.enclos.com/site-info/news/bending-glass-in-the-parametric-age.
Neugebauer et al; "Let Thin Glass In The Faade Move Thin Glass-New Possibilities For Glass In The Faade", Conference Paper, Jun. 2018, 12 Pages.
Vakar et al; "Cold Bendable, Laminated Glass—New Possibilities in Design"; Structural Engineering International, vol. 2, 2004, pp. 95-97.
Weijde; "Graduation Plan", Jan. 2017; 30 Pages.
Werner; "Display Materials and Processes," Information Display; May 2015; 8 Pages.
International Search Report and Written Opinion of the International Searching Authority; PCT/US2018/050772; dated Dec. 19, 2018; 10 Pages; European Patent Office.
"Stainless Steel—Grade 410 (UNS S41000)", available online at <https://www.azom.com/article.aspx?ArticleID=970>, Oct. 23, 2001, 5 pages.
"Standard Test Method for Measurement of Glass Stress--Optical Coefficient", ASTM International, Designation: C770-16, 2016.
Ashley Klamer, "Dead front overlays", Marking Systems, Inc., Jul. 8, 2013, 2 pages.
ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
ASTM Standard C770-98 (2013), "Standard Test Method for Measurement of Glass Stress-Optical Coefficient".
Burchardt et al., (Editorial Team), Elastic Bonding: The basic principles of adhesive technology and a guide to its cost-effective use in industry, 2006, 71 pages.
Byun et al; "A Novel Route for Thinning of LCD Glass Substrates"; SID 06 Digest; pp. 1786-1788, v37, 2006.
Datsiou et al., "Behaviour of cold bent glass plates during the shaping process", Engineered Transparency. International Conference atglasstec, Dusseldorf, Germany, Oct. 21 and 22, 2014, 9 pages.
Engineering ToolBox, "Coefficients of Linear Thermal Expansion", available online at <https://www.engineeringtoolbox.com/linear-expansion-coefficients-d_95.html>, 2003, 9 pages.
Fauercia "Intuitive HMI for a Smart Life on Board" (2018); 8 Pages http://www.faurecia.com/en/innovation/smart-life-board/intuitive-HMI.
Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].
Ferwerda et al., "Perception of sparkle in anti-glare display screens", Journal of the SID, vol. 22, Issue 2, 2014, pp. 129-136.
Galuppi et al; "Buckling Phenomena In Double Curved Cold-Bent Glass;" Intl. Journal of Non-Linear Mechanics, vol. 64, 2014, pp. 70-84.
Galuppi et al; "Large Deformations and Snap-Through Instability of Cold-Bent Glass"; Challenging Glass 4 & Cost Action TU0905 Final Conference, 2014, pp. 681-689.
Galuppi et al: "Optical cold bending of laminated glass"; Jan. 1, 2007 vol. 52, No. 1/2 Jan. 1, 2007.
Gollier et al., "Display Sparkle Measurement and Human Response", SID Symposium Digest of Technical Papers, vol. 44, Issue 1, 2013, pp. 295-297.
Indian Patent Application No. 201917031293 Office Action dated May 24, 2021; 6 pages; Indian Patent Office.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Li et al., "Effective Surface Treatment on the Cover Glass for Autointerior Applications", SID Symposium Digest of Technical Papers, vol. 47, 2016, pp. 467-469.
Pambianchi et al; "Corning Incorporated: Designing a New Future With Glass And Optics"; Chapter 1 In "Materials Research for Manufacturing: An Industrial Perspective of Turning Materials Into New Products"; Springer Series Material Science, Science 224, p. 12 (2016).
Pegatron Corp. "Pegaton Navigate the Future"; Ecockpit/Center Console Work Premiere; Automotive Worlds, Downloaded on Jul. 12, 2017, 2 Pages.
Photodon, "Screen Protectors For Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).
Product Information Sheet, Corning® Gorilla® Glass 3 with Native Damage Resistance™, Corning Incorporated, 2015, Rev: F_090315, 2 pages.
Scholze, H., "Glass-Water Interactions", Journal of Non-Crystalline Solids vol. 102, Issues 1-3,Jun. 1, 1988, pp. 1-10.
Stattler; "New Wave—Curved Glass Shapes Design"; Glass Magazine; (2013); 2 Pages.
Stiles Custom Metal, Inc., Installation Recommendations, 2010 (https://stilesdoors.com/techdata/pdf/Installation%20Recommendations%20HM%20Windows,%20Transoms%20&%>OSidelites%200710.pdf) (Year: 2010).
Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Zhixin Wang, Polydimethylsiloxane mechanical properties measured by macroscopic compression and anoindentation techniques. Graduate Theses and Dissertations, University of South Florida, 2011, 79 pages.

\* cited by examiner

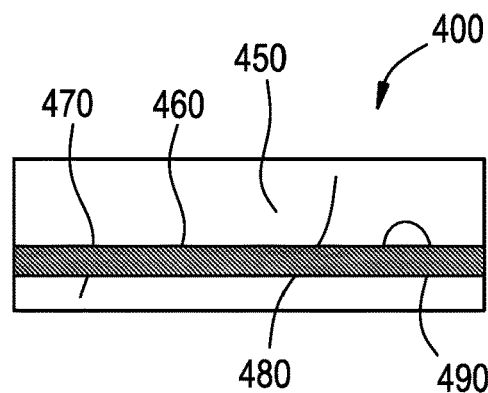
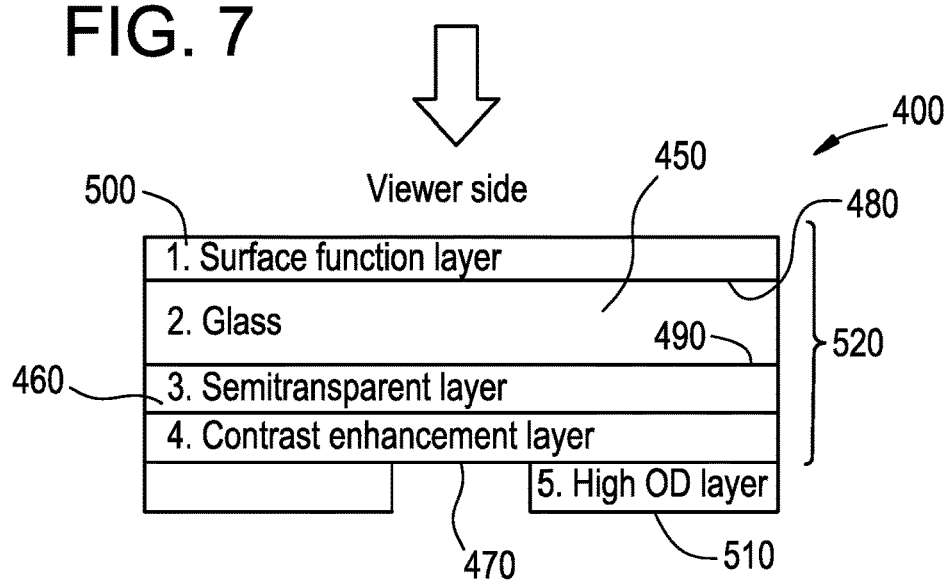
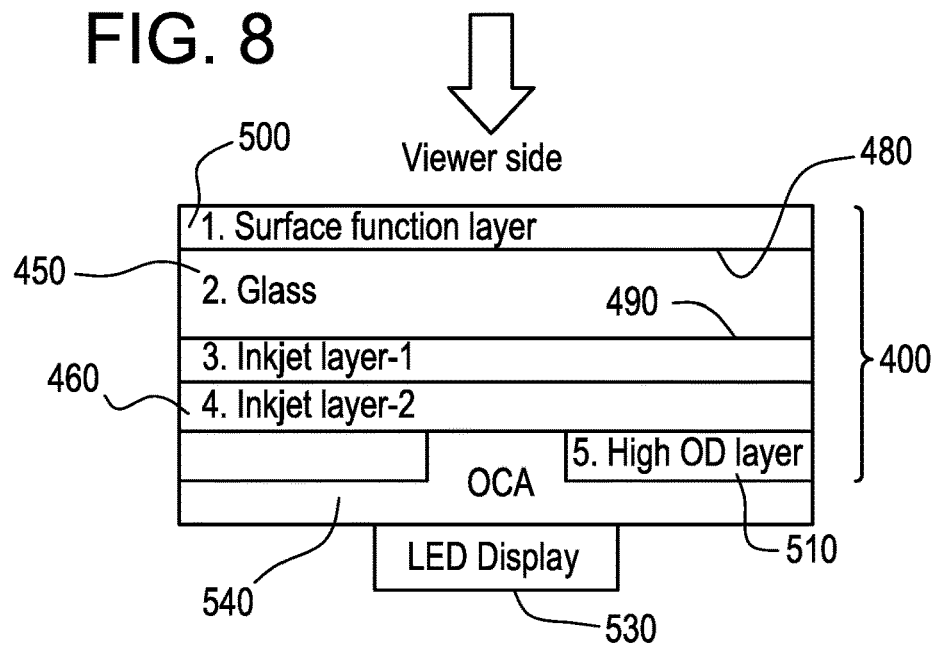

White Ink (128:40) T

700

FIG. 38
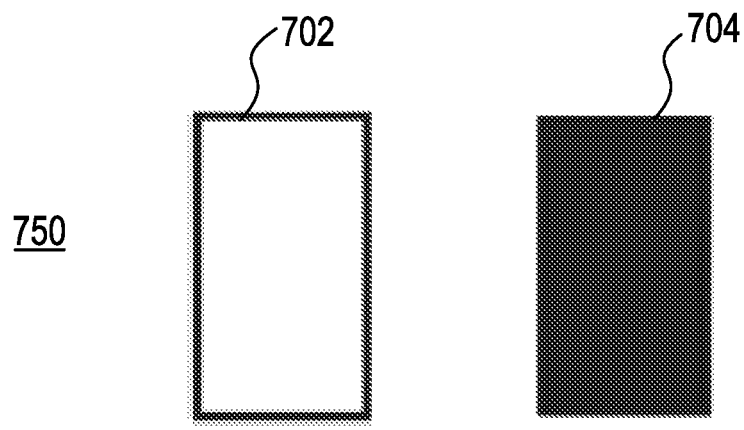
750
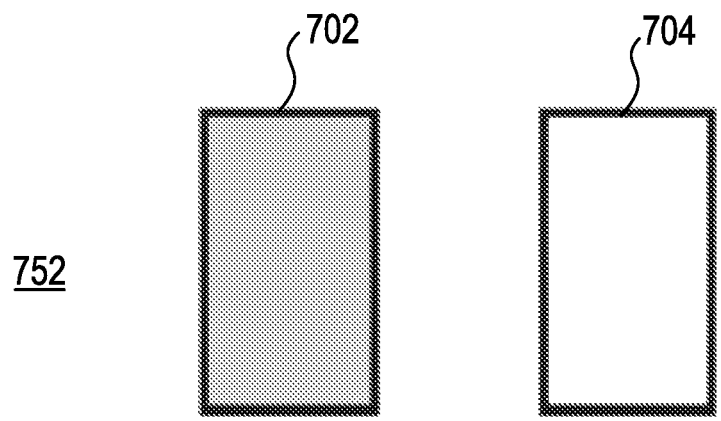
752
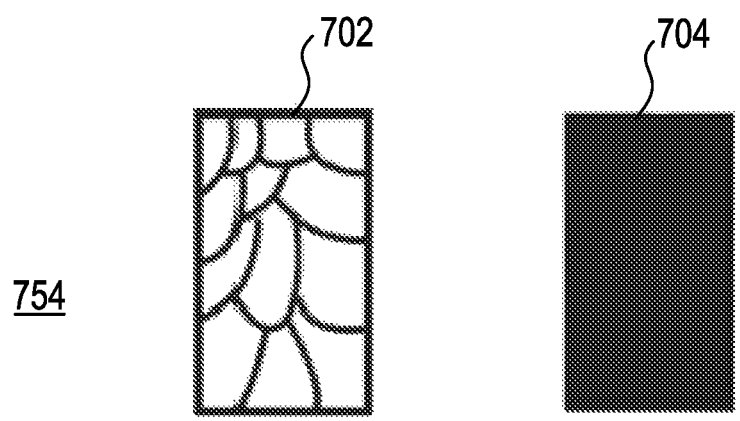
754

FIG. 39
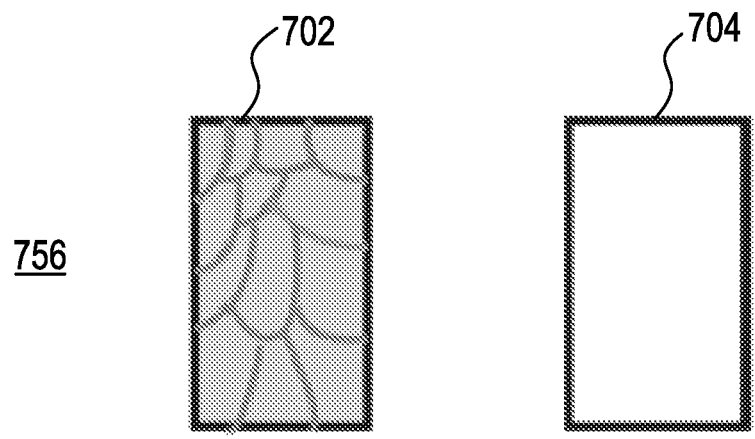
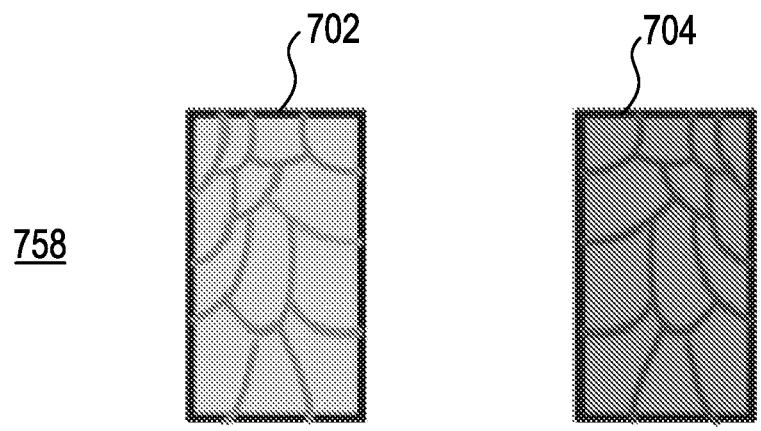
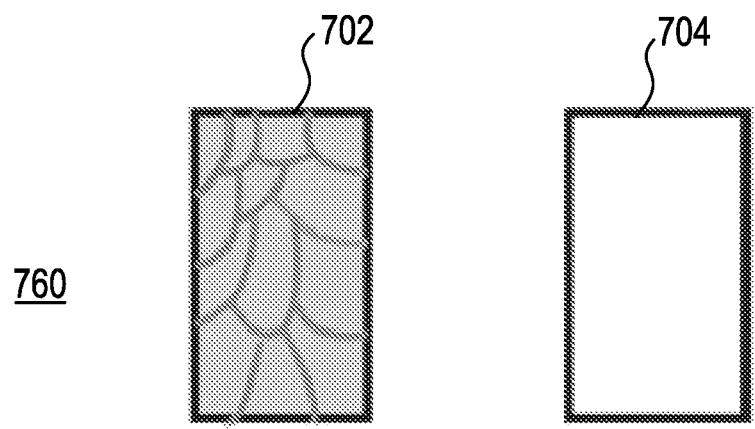

TACTILE ELEMENTS FOR DEADFRONTED GLASS AND METHODS OF MAKING THE SAME

CROSS-REFERENCE TO RELATED APPLICATIONS

This application is a national stage application under 35 U.S.C. § 371 of International Patent Application Serial No. PCT/US2018/050772 filed on Sep. 12, 2018 which claims the benefit of priority under 35 U.S.C. § 119 of U.S. Provisional Application Ser. No. 62/729,695 filed on Sep. 11, 2018, U.S. Provisional Application Ser. No. 62/679,278 filed on Jun. 1, 2018 and U.S. Provisional Application Ser. No. 62/557,502 filed on Sep. 12, 2017, the contents of each are relied upon and incorporated herein by reference in their entireties.

BACKGROUND

Field

The present disclosure relates to a deadfront article for display methods and apparatus for providing improved visual and optionally tactile features on a substrate. More particularly, the disclosure relates to deadfront articles with a tactile feel on the front surface of the deadfront article.

Background

In recent years, consumer products, including automobile interior components, have been incorporating more touch screen and deadfront type control displays and less push-button and knob oriented controls. A deadfront article includes a surface that exhibits a deadfront effect in which the surface disguises or masks underlying display features from a viewer when the article is not backlit, but permits the display features to be viewed when the article is backlit.

Accordingly, a need exists for innovations in touch screen and deadfront type control displays.

SUMMARY

The present disclosure is related to deadfront articles for consumer products that provide a decorative surface with a tactile feel. Disclosed deadfront articles may be incorporated into a consumer product to provide a surface with a decorative appearance (e.g., stainless steel, wood, etc.), a tactile feel, and underlying control features (e.g., display buttons/icons). Disclosed deadfront articles may be used to make sleek, lightweight, strong, decorative, and functional surfaces with a tactile feel in various industries. For example, disclosed deadfront articles may be used in the automotive industry to provide a deadfronted control display with a haptic features for automobile interiors.

In a first aspect a deadfront article is described, the deadfront article including a substrate having a first surface and a second surface opposite the first surface; a visual element disposed on the second surface of the substrate and/or within the substrate such that the visual element may be viewed through the first surface, the visual element including a graphic that may be viewed through the first surface; at least one tactile element formed on the first surface of the substrate, the at least one tactile element comprising one or more surface roughness portions, where at least one of the one or more surface roughness portions is positioned on the first surface of the substrate in a complimentary fashion to the graphic; a semi-transparent layer disposed on at least a first portion of the second surface of the substrate, the semi-transparent layer having a region of a solid color or of a design of two or more colors; and a contrast layer disposed on at least a portion of the region, the contrast layer configured to enhance visibility of the color of the region or to enhance contrast between the colors of the design of the region on the portion of the region on which the contrast layer is disposed.

In a second aspect, the deadfront article according to aspects of the preceding paragraph may include one or more surface roughness portions are defined by one of: (i) an area of relatively higher surface roughness bordered by at least one area of relatively lower surface roughness, and (ii) an area of relatively lower surface roughness bordered by at least one area of relatively higher surface roughness.

In a third aspect, the deadfront article according to aspects of any of the preceding paragraphs may include a graphic that includes an icon.

In a forth aspect, the deadfront article according to aspects of any of the preceding paragraphs may include one or more surface roughness portions that include an etched portion of the first surface of the substrate.

In a fifth aspect, the deadfront article according to aspects of any of the preceding paragraphs may include a first surface where the majority of the total surface area of the first surface of the substrate includes a first surface roughness, and the one or more surface roughness portions of the tactile element cover a minority of the total surface area of the first surface and comprise a second surface roughness, which is different from the first surface roughness. In some embodiments, the second surface roughness may be relatively rougher than the first surface roughness. In some embodiments, the second surface roughness may have a $R_a$ surface roughness of greater than about 80 nm. In some embodiments, the first surface roughness may be relatively rougher than the second surface roughness. In some embodiments, the first surface roughness may have a $R_a$ surface roughness of greater than about 80 nm.

In a sixth aspect, the deadfront article according to aspects of any of the preceding paragraphs may include a substrate that includes a material selected from the group of: a glass, a glass ceramic, and a polymer.

In a seventh aspect, the deadfront article according to aspects of any of the preceding paragraphs may include a substrate that includes strengthened glass.

In an eighth aspect, the deadfront article according to aspects of any of the preceding paragraphs may include a high optical density layer disposed onto at least a portion of the contrast layer such that the contrast layer is located between the high optical density layer and the semi-transparent layer. In some embodiments, the high optical density layer at least in part defines the graphic.

In a ninth aspect, the deadfront article according to aspects of any of the preceding paragraphs may include a color layer disposed in regions of the visual element such that, in at least a portion of the visual element defined by the high optical density layer, the contrast layer is located between the semi-transparent layer and the color layer.

In a tenth aspect, the deadfront article according to aspects of any of the preceding paragraphs may include a semi-transparent layer that has a design of two or more colors, the design including at least one of a leather grain pattern, a wood grain pattern, a fabric pattern, a brushed metal finish pattern, and a logo.

In a eleventh aspect, the deadfront article according to aspects of any of the preceding paragraphs may include a touch panel located behind the visual element, the touch panel configured to respond to a touch by a user.

In a twelfth aspect, an automobile interior is described, the automobile interior including a deadfront article including a substrate having a first surface and a second surface opposite the first surface; a visual element disposed on the second surface of the substrate and/or within the substrate such that the visual element may be viewed through the first surface, the visual element including a graphic that may be viewed through the first surface; at least one tactile element formed on the first surface of the substrate, the at least one tactile element comprising one or more surface roughness portions, where at least one of the one or more surface roughness portions is positioned on the first surface of the substrate in a complimentary fashion to the graphic; a semi-transparent layer disposed on a second surface of the substrate layer; a contrast layer disposed on at least a portion of the semi-transparent layer; and a high optical density layer disposed on at least a portion of the contrast layer, the high optical density layer at least in part defining the graphic; and a touch panel located behind the visual element, the touch panel configured to respond to a touch by a user.

In a thirteenth aspect, the automobile interior according to aspects of the preceding paragraph may include a graphic that is an icon and the touch panel is configured to respond to a user's touch of the icon.

In a fourteenth aspect, the automobile interior according to aspects of either of the two preceding paragraphs may include a semi-transparent layer that has a region of a solid color or of a design of two or more colors, the design including at least one of a leather grain pattern, a wood grain pattern, a fabric pattern, a brushed metal finish pattern, and a logo.

In a fifteenth aspect, the automobile interior according to aspects of any of the three preceding paragraphs may include a high optical density layer disposed onto at least a portion of the contrast layer such that the contrast layer is located between the high optical density layer and the semi-transparent layer.

In a sixteenth aspect, the automobile interior according to aspects of any of the four preceding paragraphs may include a color layer disposed in regions of the visual element such that, in at least a portion of the visual element defined by the high optical density layer, the contrast layer is located between the semi-transparent layer and the color layer.

In a seventeenth aspect, a method of forming a tactile element on a deadfront article is described, the method including forming at least one tactile element on a first surface of a substrate in a complimentary fashion to a graphic defined by a visual element disposed on a second surface of the substrate opposite the first surface and/or within the substrate such that the graphic may be viewed through the first surface, where the at least one tactile element is formed by a process including at least one of etching, sandblasting, polishing, and engraving.

In an eightieth aspect, the method according to aspects of the preceding paragraph may include forming the at least one tactile element by an etching process. In some embodiments, the etching process may include etching the first surface with a first etching solution; disposing a mask over the first surface after etching the first surface with the first etching solution, the mask comprising a shape corresponding to the shape of the graphic; and etching an unmasked region of the first surface with a second etching solution. In some embodiments, the first etching solution may include hydrofluoric acid, ammonium fluoride, and a water miscible organic solvent, and the second etching solution may include hydrofluoric acid.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6 is a side cross-sectional view of a deadfront article for a display having a semi-transparent layer and a contrast layer, according to an exemplary embodiment.

FIG. 7 is another side-sectional view of a deadfront article for display having a functional surface layer and an opaque layer, according to an exemplary embodiment.

FIG. 8 is a side-sectional view of an LED display including a deadfront article, according to an exemplary embodiment.

FIGS. 38 and 39 depict schematic images of a substrate as it moves through a process for disposing visual and tactile features thereon.

DETAILED DESCRIPTION

Figure 1:
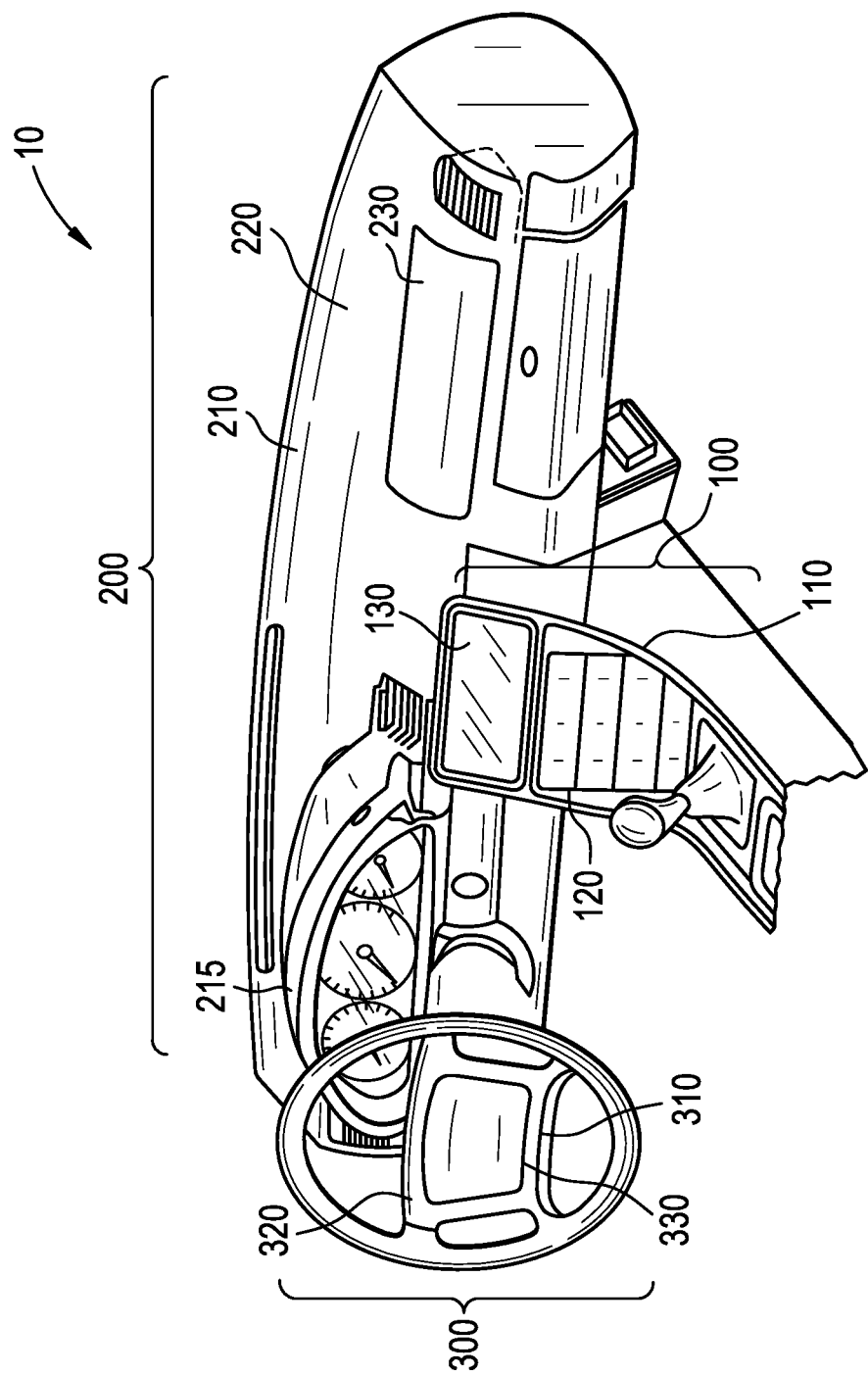
FIG. 1 is a perspective view of a vehicle interior with vehicle interior systems utilizing a deadfront article according to one or more of the embodiments discussed herein.

Referring generally to the figures, vehicle interior systems may include a variety of different flat or curved surfaces that are designed to be transparent, such as flat or curved display surfaces, and the present disclosure provides articles and methods for forming these flat or curved surfaces. In one or more embodiments, such surfaces are formed from glass materials or from plastic materials. Forming curved or flat vehicle surfaces from a glass material may provide a number of advantages compared to the typical curved or flat plastic panels that are conventionally found in vehicle interiors. For example, glass is typically considered to provide enhanced functionality and user experience for many flat or curved cover material applications, such as display applications and touch screen applications, compared to plastic cover materials.

Further, it is considered desirable in many applications to equip displays, and particularly displays for vehicle interior systems, with a deadfront appearance. In general, a deadfront appearance blocks visibility of underlying display components, icons, graphics, etc. when the display is off, but allows display components to be easily viewed when the display is on or activated (in the case of a touch-enabled display). In addition, an article that provides a deadfront effect (i.e., a deadfront article) can be used to match the color or pattern of the article to adjacent components to eliminate the visibility of transitions from the deadfront article to the surrounding components. This can be especially useful when the deadfront article is a different material from the surrounding components (e.g., the deadfront article is formed from a glass material but surrounded by a leather-covered center console). For example, a deadfront article may have a wood grain pattern or a leather pattern can be used to match the appearance of the display with surrounding wood or leather components of a vehicle interior system (e.g., a wood or leather dashboard) in which the display is mounted.

Various embodiments of the present disclosure relate to the formation of a curved glass-based deadfront article utilizing a cold-forming or cold-bending process. As discussed herein, curved glass-based deadfront articles and processes for making the same are provided that avoid the deficiencies of the typical glass hot-forming process. For example, hot-forming processes are energy intensive and increase the cost of forming a curved glass component, relative to the cold-bending processes discussed herein. In addition, hot-forming processes typically make application of glass coating layers, such as deadfront ink or pigment layers, more difficult. For example, many ink or pigment materials cannot be applied to a flat piece of glass material prior to the hot-forming process because the ink or pigment materials typically will not survive the high temperatures of the hot-forming process. Further, application of an ink or pigment material to surfaces of a curved glass article after hot-bending is substantially more difficult than application to a flat glass article.

Various embodiments of the present disclosure relate to deadfronted articles with areas of tactile feel on the front surface. As the use of touch screen and deadfront types displays increases, the importance of aesthetic features and the integration of form and function, also increases. An deadfront article that facilitates both visual and tactile interaction with a user makes interaction with article more convenient for a user. A deadfront article with areas of tactile fell can create "invisible" controls for a user on a decorated surface having the appearance of any material imagined (e.g., carbon fiber, stainless steel, wood, etc.) when the deadfront article is off.

FIG. 1 shows a vehicle interior 10 that includes three different vehicle interior systems 100, 200, 300, according to an exemplary embodiment. Vehicle interior system 100 includes a center console base 110 with a flat or curved surface 120 including a display, shown as flat or curved display 130. Vehicle interior system 200 includes a dashboard base 210 with a curved surface 220 including a display, shown flat or curved display 230. The dashboard base 210 typically includes an instrument panel 215 which may also include a flat or curved display. Vehicle interior system 300 includes a dashboard steering wheel base 310 with a curved surface 320 and a display, shown as a flat or curved display 330. In one or more embodiments, the vehicle interior system may include a base that is an arm rest, a pillar, a seat back, a floor board, a headrest, a door panel, or any portion of the interior of a vehicle that includes a curved surface.

The embodiments of the deadfront articles described herein can be used in any or all of vehicle interior systems 100, 200 and 300. While FIG. 1 shows an automobile interior, the various embodiments of the vehicle interior system may be incorporated into any type of vehicle such as trains, automobiles (e.g., cars, trucks, buses and the like), sea craft (boats, ships, submarines, and the like), and aircraft (e.g., drones, airplanes, jets, helicopters and the like), including both human-piloted vehicles, semi-autonomous vehicles and fully autonomous vehicles. Further, while the description herein relates primarily to the use of the deadfront embodiments used in vehicle displays, it should be understood that various deadfront embodiments discussed herein may be used in any type of display application. For example, deadfronted articles with areas of tactile feel may be incorporated into an article with a display (or display articles) (e.g., consumer electronic products, including mobile phones, tablets, computers, navigation systems, wearable devices (e.g., watches and the like)), architectural articles (e.g., a window or window assembly), or appliance articles (e.g., refrigerators or ranges).

Figure 2:
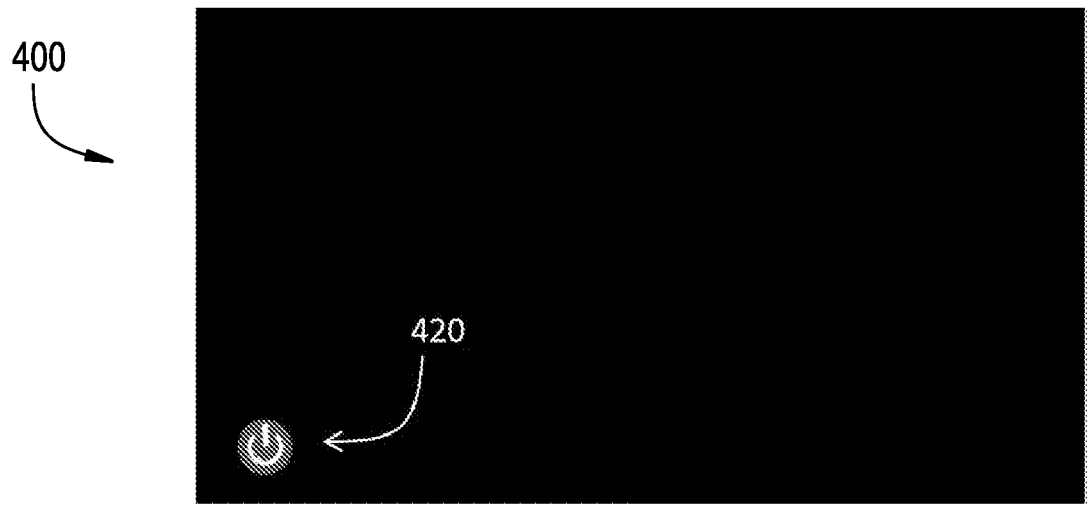
FIG. 2 shows a display with a solid color deadfront article with the display turned off, according to an exemplary embodiment.
Figure 3:
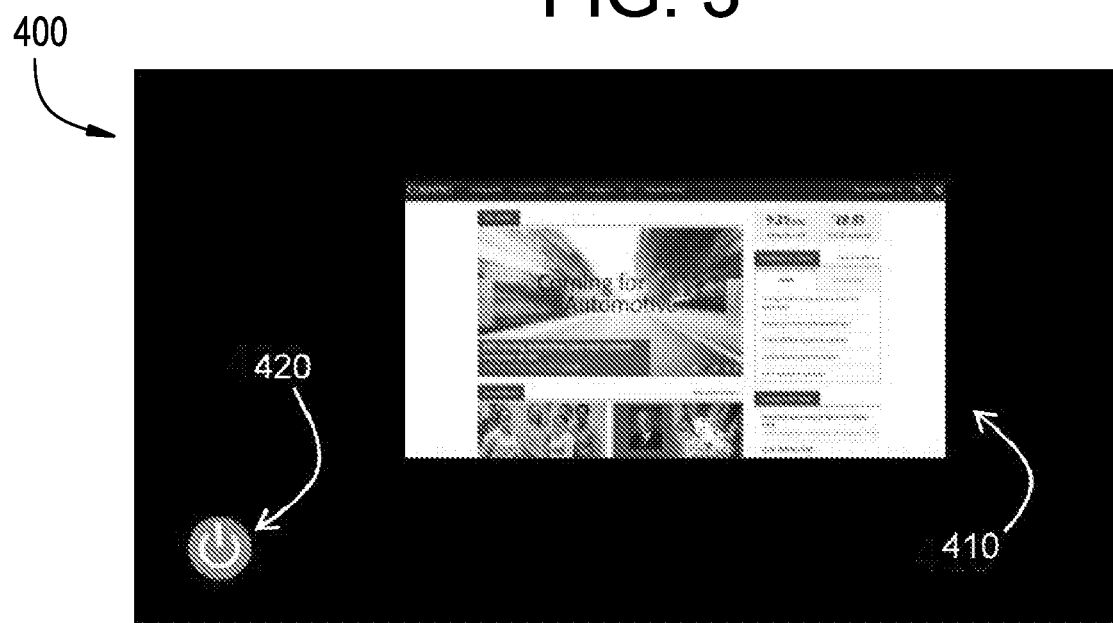
FIG. 3 shows the display with the deadfront article of FIG. 2 with the display turned on, according to an exemplary embodiment.

Referring to FIG. 2 and FIG. 3, a deadfront article 400 for a vehicle display, such as displays 130, 230 and/or 330, is shown and described. FIG. 2 shows the appearance of deadfront article 400 when a light source of the associated display is inactive, and FIG. 3 shows the appearance of deadfront article 400 when a light source of the associated display is active. As shown in FIG. 3, with the light source activated, a graphic 410 and/or a plurality of icons are visible through the deadfront article. When the light source is inactivated, the graphic 410 disappears, and deadfront article 400 presents a surface showing a desired surface finish (e.g., a black surface in FIG. 2) that is unbroken by graphics 410. In some embodiments, the light source is activated using a power button 420. As shown in the embodiments of FIGS. 2 and 3, the power button 420 may be lighted and changes from red to green when activated. In exemplary embodiments, the power button 420 is selected to conform with one of IEC 60417-5007, IEC 60417-5008, IEC 60417-5009, and IEC 60417-5010.

Figure 4:
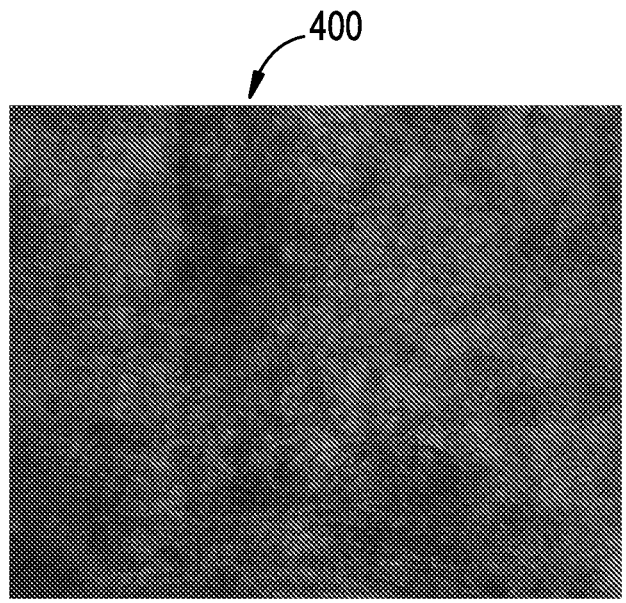
FIG. 4 shows a display with a patterned deadfront article with the display turned off, according to an exemplary embodiment.
Figure 5:
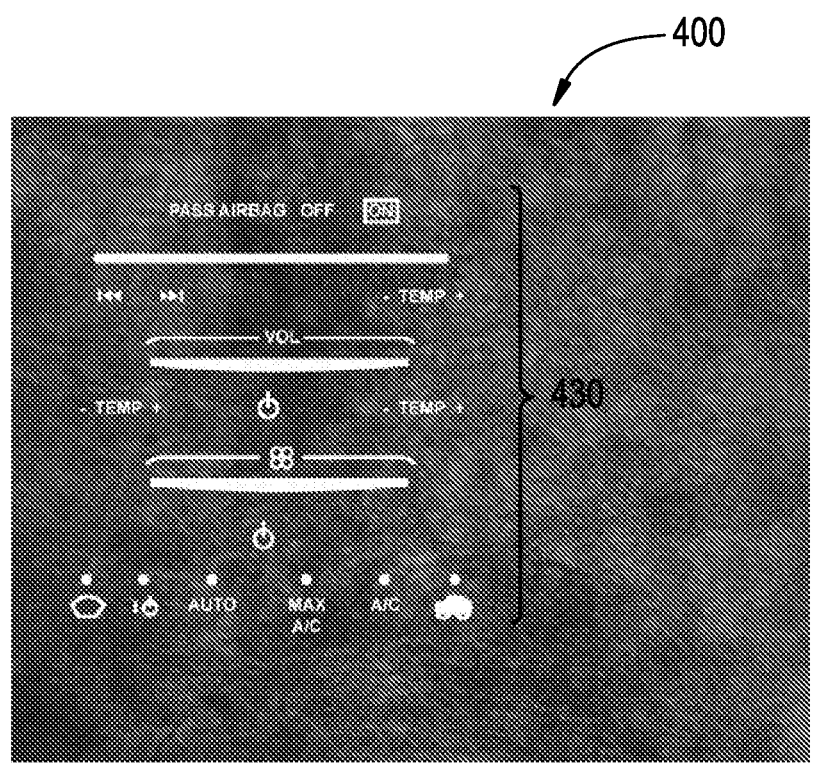
FIG. 5 shows the display with the deadfront article of FIG. 4 with the display turned on, according to an exemplary embodiment.

FIGS. 4 and 5 depict another embodiment of a deadfront article 400 for a vehicle display, such as displays 130, 230 and/or 330. In comparison to the solid color deadfront article 400 of FIG. 2, a patterned deadfront article 400 is depicted in FIG. 4. When a light source of the associated display is inactive as in FIG. 4, only the pattern of the deadfront article 400 can be seen. In FIG. 3, the light source of the associated display is active and icons 430 can be seen through the deadfront article 400. Thus, when the light source is inactivated, icons 430 disappear, and deadfront article 400 presents a surface showing a desired pattern (e.g., a leather grain pattern in FIG. 4) that is unbroken by icons 430.

As will be discussed in more detail below, deadfront article 400 provides this differential icon display by utilizing one or more colored layers disposed between an outer substrate and a light source. The optical properties of the colored layers are designed such that when the light source is turned off the borders of the icons or other display structures beneath the colored layer are not visible, but when the light source is on, graphics 410 and/or icons 430 are visible. In various embodiments, the deadfront articles discussed herein are designed to provide a high quality deadfront appearance, including high contrast icons with the light source on, combined with a uniform deadfront appearance when the light is off. Further, these various deadfront articles may be formed using materials suitable for cold forming to curved shapes, including complex curved shapes, as discussed below.

Referring now to FIG. 6, an embodiment of the structure of the deadfront article 400 is provided. In particular, the deadfront article 400 includes at least a substrate 450, a semi-transparent layer 460, and a contrast layer 470. Semi-transparent layer 460 may include a region of solid color or a design of two or more colors. The solid color or design of two or more colors of semi-transparent layer may produce a decorative color or pattern for deadfront article 400 (e.g., wood-grain design, a leather-grain design, a fabric design, a brushed metal design, a graphic design, a solid color and/or a logo). Contrast layer 470 may be configured to enhance the visibility of the color of semi-transparent layer 460 and/or enhance contrast between the colors of semi-transparent layer 460.

The substrate 450 has an outer surface 480 facing a viewer and an inner surface 490 upon which the semi-transparent layer 460 and/or the contrast layer 470 are, at least in part, disposed. As used herein, the term "dispose" includes coating, depositing and/or forming a material onto a surface using any known method in the art. The disposed material may constitute a layer, as defined herein. As used herein, the phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a layer, as defined herein. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

While the specifics of the substrate 450 will be discussed in greater detail below, in some embodiments the substrate 450 has a thickness of from 0.05 to 2.0 mm (millimeters). In one or more embodiments, the substrate may be a transparent plastic, such as PMMA, polycarbonate and the like, or may include glass material (which may be optionally strengthened). As will also be discussed more fully below, in some embodiments the semi-transparent layer 460 is printed onto at least a portion of the inner surface 490 of the substrate 450. In other embodiments, the semi-transparent layer 460 is deposited using non-conductive vacuum metallization. Further, in some embodiments, the contrast layer 470 is printed onto at least a portion of the inner surface 490 of the substrate 450 and/or onto at least a portion of the semi-transparent layer 460.

In certain embodiments, such as shown in FIG. 7, the deadfront article 400 also includes a functional surface layer 500 and/or an opaque layer 510 (also referred to as "high optical density layer"). The functional surface layer 500 can be configured to provide one or more of a variety of functions. In another exemplary embodiment, the functional surface layer 500 is an optical coating configured to provide easy-to-clean performance, anti-glare properties, anti-reflection properties, and/or half-mirror coating. Such optical coatings can be created using single layers or multiple layers. In the case of anti-reflection functional surface layers, such layers may be formed using multiple, layers having alternating high refractive index and low refractive index. Non-limiting examples of low-refractive index materials include $SiO_2$, $MgF_2$, and $Al_2O_3$, and non-limiting examples of high-refractive index materials include $Nb_2O_5$, $TiO_2$, $ZrO_2$, $HfO_2$, and $Y_2O_3$. In some embodiments, the total thickness of such an optical coating (which may be disposed over an anti-glare surface or a smooth substrate surface) is from 5 nm to 750 nm. Additionally, in some embodiments, the functional surface layer 500 that provides easy-to-clean performance provides enhanced feel for touch screens and/or coating/treatments to reduce fingerprints. In some embodiments, functional surface layer 500 is integral to the outer surface 480 of the substrate. For example, such functional surface layers can include an etched surface in the outer surface 480 of the substrate 450 providing an anti-glare surface (or haze of from, e.g., 2% to 20%). The functional surface layer 500, if provided, along with the substrate 450, the semi-transparent layer 460, and the contrast layer 470 together comprise the semi-transparent structure 520 of the deadfront article 400.

As will be discussed more fully below, the opaque layer 510 has high optical density in order to block light transmittance. As used herein, "opaque layer" is used interchangeably with "high optical density layer." In some embodiments, the opaque layer 510 is used to block light from transmitting through certain regions of the deadfront article 400. In certain embodiments, the opaque layer 510 obscures functional or non-decorative elements provided for the operation of the deadfront article 400. In other embodiments, the opaque layer 510 is provided to outline backlit icons and/or other graphics (such as the graphic 410 and/or power button 420 shown in FIGS. 2 and 3 and the icons 430 shown in FIG. 5) to increase the contrast at the edges of such icons and/or graphics. Thus, in some embodiments, the opaque layer 510 has interruptions in the layer that define a window for the graphic(s) 410, power button(s) 420, and/or icon(s) 430. That is, in some embodiments, the opaque layer 510 extends continuously until an edge of a perimeter for a graphic 410, power button 420, and/or icon 430 is reached. At such a perimeter edge, the opaque layer 510 stops, or in some embodiments, substantially decreases in optical density (e.g., thins in material thickness, decreases in material density, etc.). In some embodiments, the opaque layer 510 resumes intermittently in the region of the graphic 410, power button 420, and/or icon 430 to define features of the graphic 410, power button 420, and/or icon 430, such as to define the "1" and "0" of certain power buttons 420, for example. Accordingly, in some embodiments, the opaque layer 510 defines an image negative for the graphic 410, power button 420, and/or icon 430 in that the portions of the graphic 410, power button 420, and/or icon 430 visible by the user through the outer surface 480 of the substrate 450 are blank regions of the opaque layer 510.

The opaque layer 510 can be any color; in particular embodiments, though, the opaque layer 510 is black or gray. In some embodiments, the opaque layer 510 is applied via screen printing or inkjet printing over the semi-transparent layer 460 and/or over the inner surface 490 of the substrate 450. Generally, the thickness of an inkjet-printed opaque layer 510 is from 1 μm to 5 μm (micrometers, microns), whereas the thickness of a screen-printed opaque layer 510 is from 5 μm to 20 μm. Thus, a printed opaque layer 510 can have a thickness in the range of from 1 μm to 20 μm. However, in other embodiments, the opaque layer 510 is a metal layer deposited via physical vapor deposition and/or is an optical stack produced using the high/low-index stacking discussed above for color matching.

Figure 28:
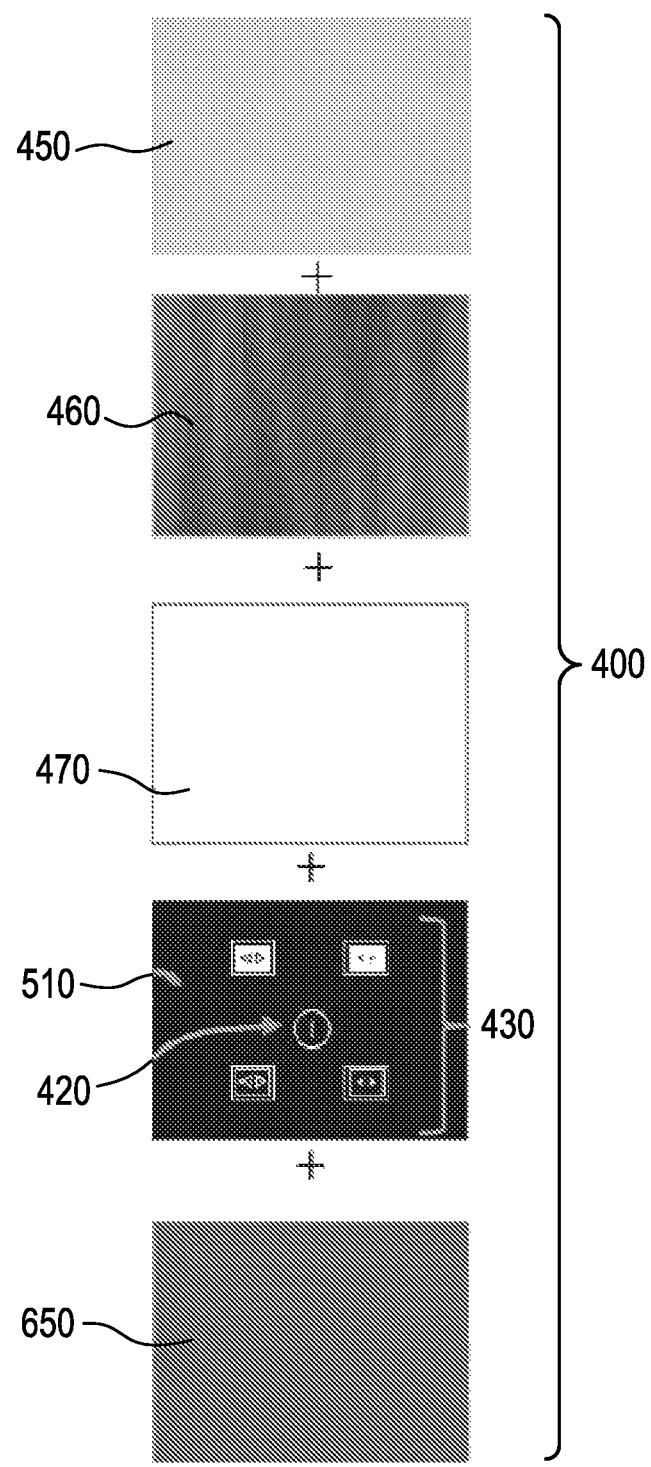
FIG. 28 is an exploded view of the layers of a deadfront article, according to an exemplary embodiment.
Figure 29:
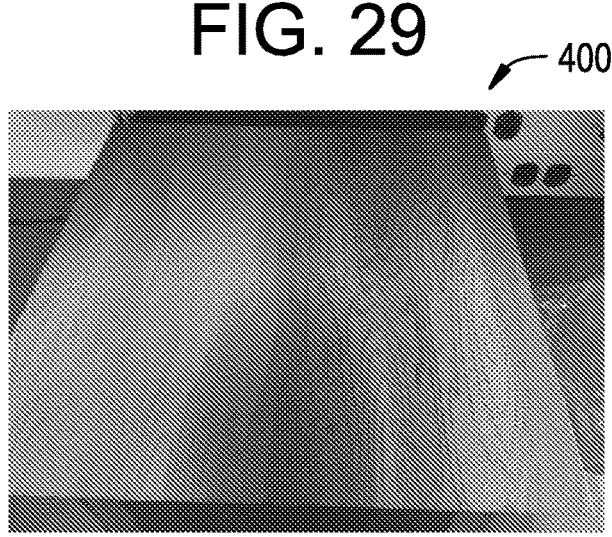
FIG. 29 depicts a wood grain deadfront article, according to an exemplary embodiment.
Figure 30:
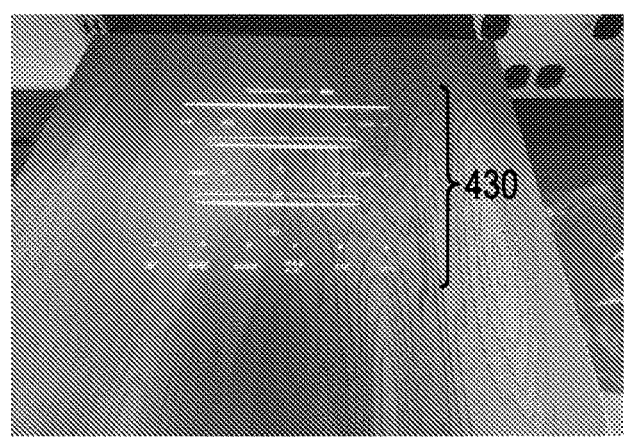
FIG. 30 depicts a wood grain deadfront article with a lighted back, according to an exemplary embodiment.
Figure 31:
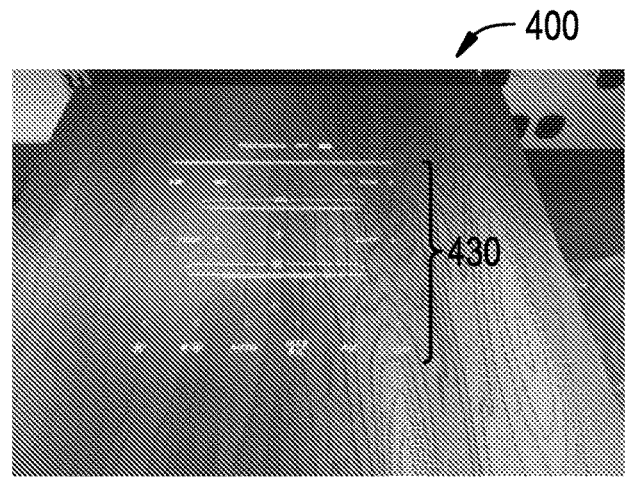
FIG. 31 depicts a wood grain deadfront article with a lighted back and icons of different colors, according to an exemplary embodiment.

FIG. 28 provides an exploded view of the layers comprising the deadfront article 400 in an embodiment. As can be seen, the layers include the substrate 450, the semi-transparent layer 460, the contrast layer 470, the opaque layer 510, and a color layer 650. As can be seen in FIG. 28, the semi-transparent layer 460 is a woodgrain pattern, and the opaque layer 510 provides negative images for icons 430, e.g., for an entertainment console, such as a power button 420, tuning controls, volume control, presets, etc. The combination of the semi-transparent layer 460, the contrast layer 470, and the opaque layer 510 provide a deadfront article 400 such as is shown in FIGS. 29 and 30. In FIG. 29, the woodgrain of the semi-transparent layer 460 is seen when the deadfront article 400 is not backlit, and when the deadfront article 400 is backlit, the icons 430 are visible through the outer surface 480 of the deadfront article 400. Referring again to FIG. 28, when the color layer 650 is disposed on the opaque layer 510 (at least in the regions of the icons 430) the color of the icons 430 can be changed as shown in FIG. 31. Further, while a solid color layer 650 is depicted in FIG. 28, the color layer 650 can include multiple colors across the layer as shown in FIG. 31 and/or specific colors in regions of specific icons 430 or portions of icons 430. In this way, the color layer 650 is a continuous layer in some embodiments, and in other embodiments, the color layer 650 is discontinuous, i.e., color is only provided in certain locations over the opaque layer 510 and/or contrast layer 470 in regions that define the icons 430.

In some embodiments, the optical densities of the layers are tailored to enhance the visibility of the graphics 410, power button 420, and/or icons 430 when the deadfront article 400 is backlit. In particular embodiments, the combined optical density of the semi-transparent layer 460 and the contrast layer 470 in illuminated regions (i.e., the graphic 410, the power button 420, and/or the icons 430) is from 1.0 to 2.1. In other embodiments, the combined optical density is 1.2 to 1.6, and in still other embodiments, the combined optical density is about 1.4. In providing the optical density of the illuminated regions, the optical density of the contrast layer 470 is from 0.9 to 2.0 in some embodiments, and the optical density of the semi-transparent layer 460 is 0.1 to 0.5 in some embodiments. In the non-illuminated regions (i.e., the regions surrounding the graphic 410, the power button 420, and/or the icons 430), the combined optical density of the semi-transparent layer 460, the contrast layer 470, and the opaque layer 510 is at least 3.4. In providing the optical density of the non-illuminated regions, the optical density of the contrast layer 470 is from 0.9 to 2.0 in some embodiments, the optical density of the semi-transparent layer 460 is from 0.1 to 0.5 in some embodiments, and the optical density of the opaque layer 510 is at least 2.4 in some embodiments. In exemplary embodiments, the optical density of the color layer 650 is from 0.3 to 0.7. Further, in some embodiments, the optical density of a particular layer can vary across the layer to provide enhanced contrast or to conserve the ink or material comprising the layer. For example, the optical density of the contrast layer 470 can be lower in illuminated regions than in non-illuminated regions. Additionally, the optical density of the color layer 650 can be lower (or zero) in non-illuminated regions than in illuminated regions.

Figure 32:
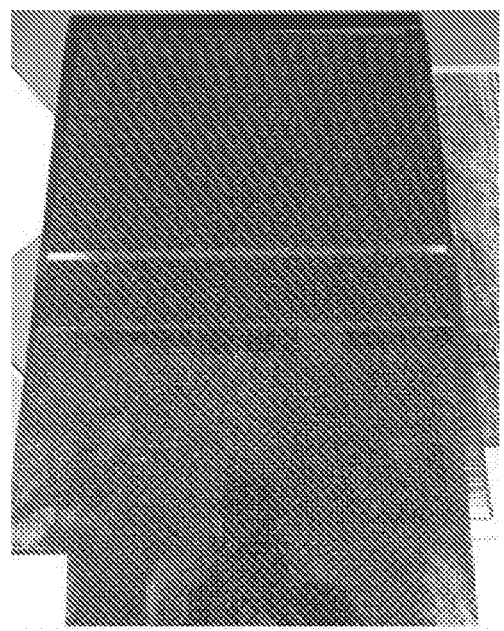
FIG. 32 depicts a carbon fiber pattern deadfront article in which the opacity is too high.
Figure 33:
FIG. 33 depicts the deadfront article of FIG. 32 with a lighted back, demonstrating that the high level of opacity obscures the icons.
Figure 34:
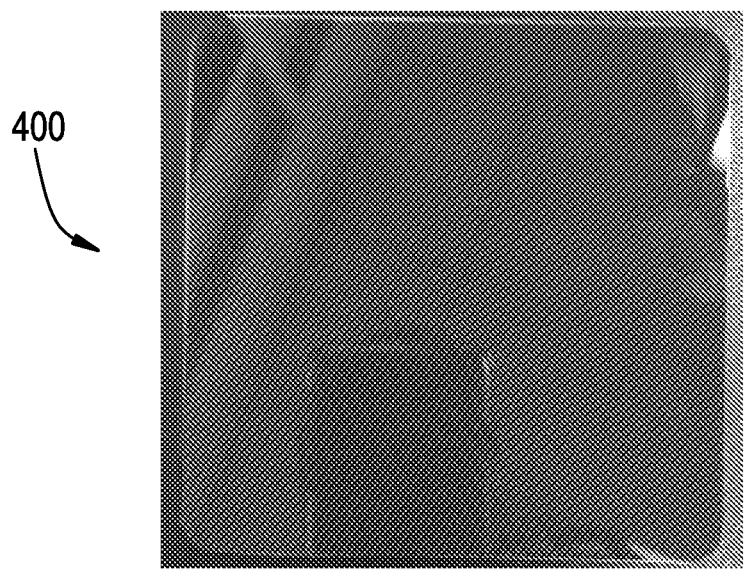
FIG. 34 depicts a carbon fiber pattern deadfront article having an opacity within the disclosed range, according to an exemplary embodiment.
Figure 35:
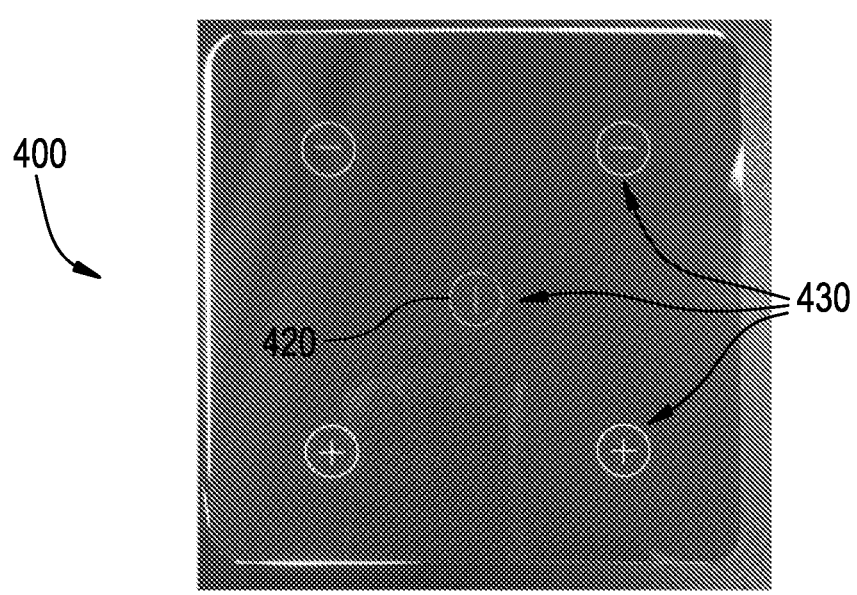
FIG. 35 depicts the deadfront article of FIG. 34 with a lighted back, demonstrating the better visibility of the icons.

FIGS. 32 and 33 and FIGS. 34 and 35 show different deadfront articles having different levels of optical density, and thus, these figures demonstrate the different appearance between deadfront articles 400 in which the optical density is too high in the illuminated regions (FIGS. 32 and 33) and in which the optical density is within the above-described ranges for the illuminated regions (FIGS. 34 and 35). As can be seen in FIG. 32, the deadfront article has a carbon fiber pattern in which the optical density of the semi-transparent layer is too high. Thus, as can be seen in FIG. 33, the illuminated region is obscured. By comparison, the deadfront article 400 in FIG. 34 has been provided with a carbon fiber pattern with a semi-transparent layer 460, contrast layer 470, and opaque layer 510 that have optical densities within the above-described ranges. Thus, as shown in FIG. 35, the icons 430 are much more defined and are clearly visible. Also as shown in FIG. 35, the center icon 430 is a power button 420 that has been provided with a red color using a color layer 650.

Figure 9:
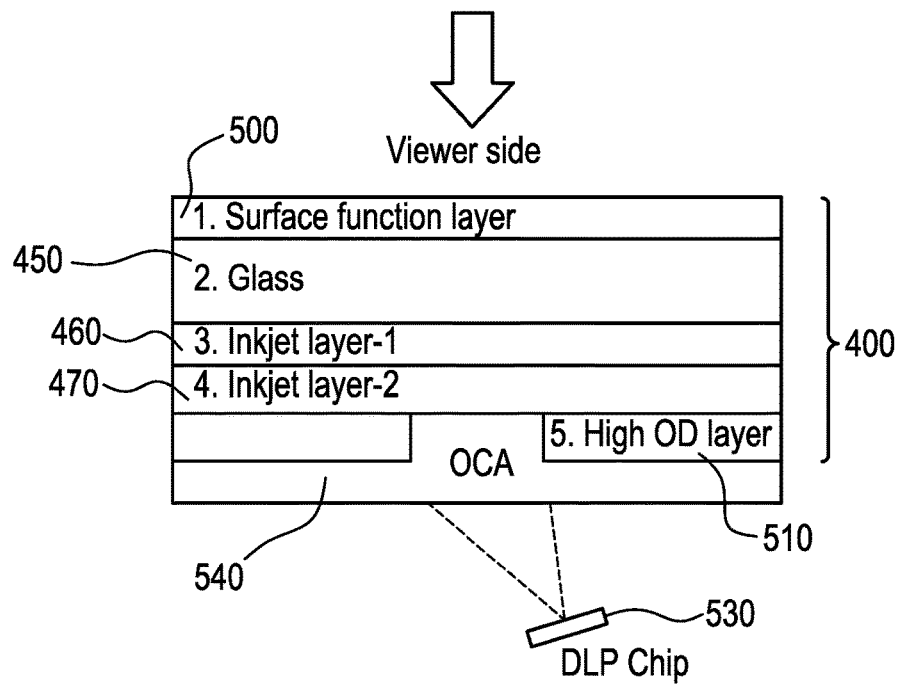
FIG. 9 is a side-sectional view of a DLP MEMS chip including a deadfront article, according to an exemplary embodiment.

As shown in FIGS. 8 and 9, the deadfront article 400 may be placed over or in front of a display 530 in some embodiments. In one or more embodiments, the display may include a touch-enabled displays which include a display and touch panel. Exemplary displays include LED (light emitting diode) displays (FIG. 8), a DLP (digital micromirror device) MEMS chip (FIG. 9), LCDs (liquid crystal displays), OLED (organic light emitting diode) displays, transmissive displays, reflective displays and the like. In some embodiments, the display 530 is affixed or mounted to the deadfront article 400 using, e.g., an optically clear adhesive 540. The deadfront article 400 has a transmittance from about 5% to 30% along the visible spectrum, i.e., a wavelength from 400 nm to 700 nm. In other words, the deadfront article 400 exhibits an average light transmittance in a range from about 5% to about 30% along the entire wavelength range from about 400 nm to about 700 nm. As used herein, the term "transmittance" is defined as the percentage of incident optical power within a given wavelength range transmitted through a material (e.g., the deadfront article, the substrate or the layers thereof). In some embodiments, the deadfront article 400 is a low transmittance deadfront article in which light transmission is 10% or less over the entire visible spectrum. In such instances, the opaque layer 510 may not be necessary to obscure the edges of the display 530, i.e., non-display regions, such as a display border, and/or wiring, connectors, etc. In other embodiments, the deadfront article 400 is a high transmittance deadfront article exhibiting an average transmittance from about 10% to about 30%. In such embodiments, the opaque layer 510 may be necessary to block non-display regions from being seen.

Figure 10:
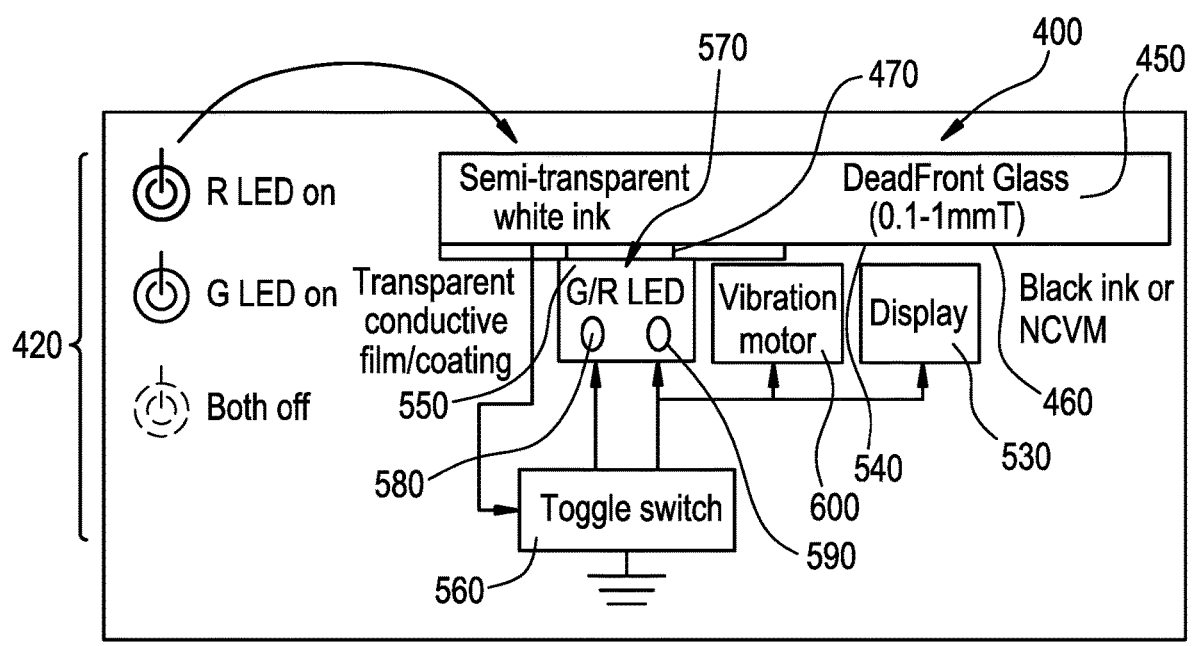
FIG. 10 is a side-sectional view of a deadfront display with touch-screen functionality, according to an exemplary embodiment.

In certain embodiments, the deadfront article 400 is provided with touch functionality as shown in FIG. 10. In FIG. 10, the deadfront article 400 includes substrate 450, a black semi-transparent layer 460, and a contrast layer 470 that is disposed on portions of the substrate 450 and of the semi-transparent layer 460. In this way, the contrast layer 470 and the semi-transparent layer 460 define an icon or a graphic, such as a power button 420 (e.g., as shown in FIGS. 2 and 3). In an embodiment, touch functionality is provided by capacitive sensing. In certain embodiments, the capacitive sensor is created by a transparent conductive film or coating 550. In an exemplary embodiment, the transparent conductive film 550 is a transparent conductive oxide (e.g., indium-tin-oxide (ITO)) coated polyester (e.g., PET) film.

Upon activation of a toggle switch (e.g., by touching the deadfront article 400 in the region of the transparent conductive film 550), a light source 570 is activated or deactivated 570. In the embodiment of FIG. 10, the light source 570 includes a red LED 580 and a green LED 590. In certain settings, such as a vehicle, the red LED 580 and green LED 590 indicate the status of the deadfront article 400. For example, prior to turning the vehicle on, both the red LED 580 and green LED 590 are off as shown at the bottom of the legend of the power button 420 states on the left of FIG. 10. When the vehicle is turned on and prior to touching the power button 420, the red LED 580 is on while the green LED 590 is off (top of the legend of power button 420 states), signifying that the display 530 is inactive. Upon touching the power button 420, the toggle switch 560 will turn off the red LED 580, turn on the green LED 590, and activate the display 530. If the user desires to inactivate the display 530 while the vehicle is still on, the user can again touch the power button 420, and the toggle switch 560 will turn off the green LED 590, turn on the red LED 580, and shut off the display 530. In certain embodiments, a vibration motor 600 is provided to provide haptic feedback each time the toggle switch 560 is activated.

Figure 11:
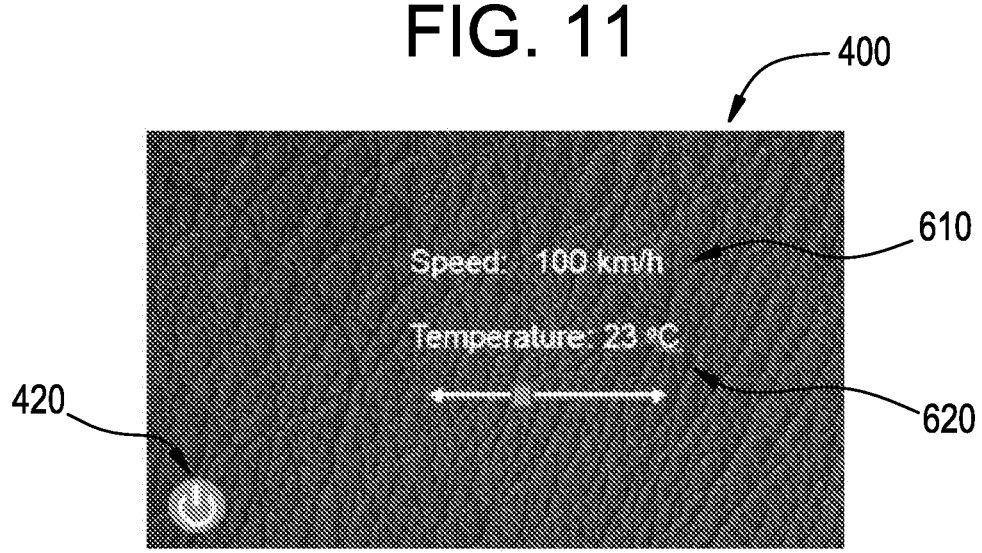
FIG. 11 is a leather grain deadfront display for a vehicle interior, according to an exemplary embodiment.
Figure 12:
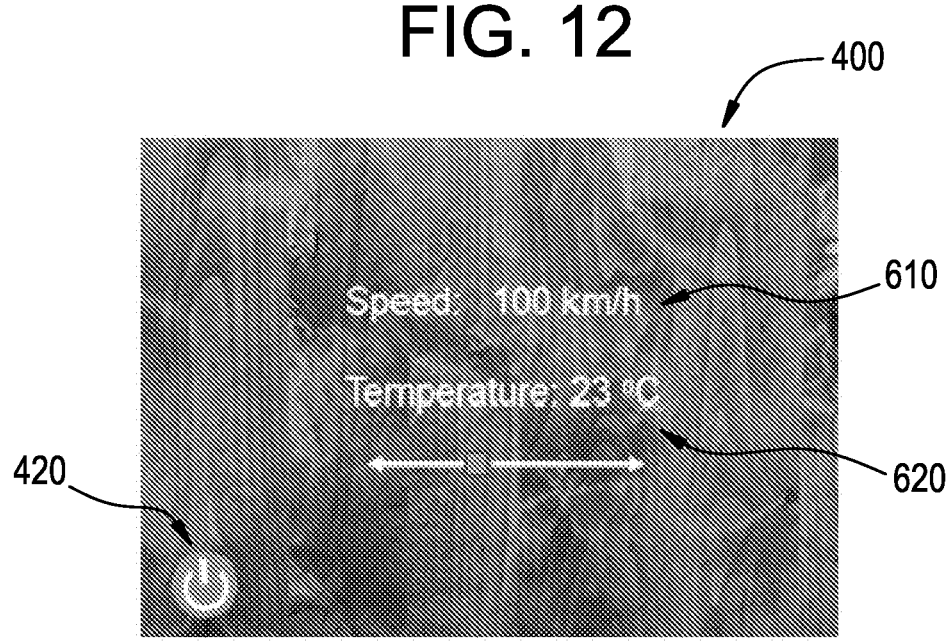
FIG. 12 is a wood grain deadfront display for a vehicle interior, according to an exemplary embodiment.

While the exemplary embodiment of a power button 420 for a display 530 was provided, the touch-functionality is suitable for other features. Continuing with the example of a vehicle, the touch-functionality is suitable for use in controlling a variety of vehicle systems, such as climate control (i.e., heating and air conditioning) systems, radio/entertainment systems, dashboard display panels (for, e.g., speedometer, odometer, trip odometer, tachometer, vehicle warning indicators, etc.), and center console display panels (for, e.g., GPS displays, in-vehicle information, etc.), among others. In FIG. 11, the deadfront article 400 is depicted with a speedometer 610 and climate controls 620. The deadfront article 400 includes a leather grain pattern. FIG. 12 provides a substantially similar deadfront article 400 with a speedometer 610 and climate controls 620, but the deadfront article 400 includes a wood grain pattern.

In particular embodiments, the substrate 450 is treated (e.g., via sandblasting, etching, engraving, etc.) in the area of a button to provide tactile feedback to a user's finger. In this way, the user can feel the deadfront article 400 for the button without removing his or her eyes from the road (in road vehicle settings). Further, in some embodiments, the toggle switch 560 is provided with a delay of, e.g., one to three seconds so as to avoid accidental activation of the toggle switch 560.

Figure 36:
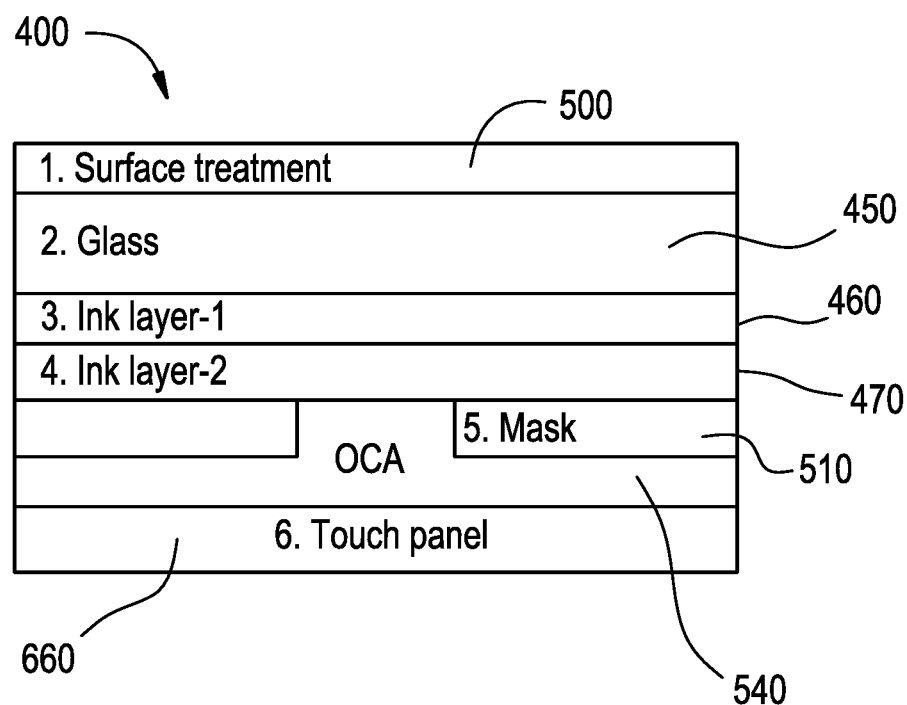
FIG. 36 depicts a deadfront article having a touch panel, according to an exemplary embodiment.

FIG. 36 provides another embodiment of a deadfront article 400 with touch functionality. In particular, the deadfront article 400 includes a touch panel 660. The touch panel 660 can be any of a variety of suitable touch panels, such as a resistive touch panel, a capacitive (e.g., surface or projected) touch panel, a surface acoustic wave touch panel, an infrared touch panel, an optical imaging touch panel, dispersive signal touch panel, or an acoustic pulse recognition touch panel. In some embodiments, the touch panel 660 is laminated to the deadfront article 400 using an optically clear adhesive 540. In other embodiments, the touch panel 660 is printed onto the deadfront article 400 such that the optically clear adhesive 540 is unnecessary. Advantageously, the touch panel 660 is cold bendable to provide a three-dimensional shape. Cold bending of the deadfront article 400 (including the touch panel 660) is described in greater detail further below.

Having described generally the structure of the deadfront article 400, attention will be turned to the semi-transparent layer 460 and the contrast layer 470. As mentioned above, the semi-transparent layer 460 and the contrast layer 470 are disposed on the substrate 450. In some embodiments, the semi-transparent layer 460 is printed onto the substrate using a CMYK color model. In some embodiments in which the contrast layer is not white, such as gray, the CMYK color model can also be used to print the contrast layer 470. In other embodiments in which the contrast layer 470 is white, color models that incorporate white ink can be used for printing the contrast layer 470. The printed semi-transparent layer 460 and the printed contrast layer 470 may each have a thickness of from 1 μm to 6 μm. In some embodiments, the color layer 650 also has a thickness of from 1 μm to 6 μm. Further, in some embodiments, the color layer 650 is printed onto the opaque layer 510 and/or the contrast layer 470. In certain embodiments, the color layer 650 is printed onto the opaque layer 510 and/or contrast layer 470 using the CMYK color model.

The ink used for printing the semi-transparent layer 460, the contrast layer 470, and/or the color layer 650 can be thermal or UV cured ink. In particular, the ink is composed of at least one or more colorants and a vehicle. The colorants can be soluble or insoluble in the vehicle. In some embodiments, the colorants are dry colorants in the form of a fine powder. Such fine powders have particles that are, in some embodiments, from 10 nm to 500 nm in size. Using the CMYK color model, the colorant provides cyan, magenta, yellow, and/or key (black) colors. For white inks, the colorant can be any of a variety of suitable pigments, such as $TiO_2$, $Sb_2O_3$, $BaSO_4$, $BaSO_4$:ZnS, ZnO, and $(PbCO_3)_2$:Pb$(OH)_2$. The colorants are dissolved or suspended in the vehicle.

The vehicle can serve as a binder to create adhesion to the surface upon which the ink is applied. Further, in some embodiments, additives are included in the vehicle specifically for the purpose of improving adhesion to glass/plastic surfaces. Non-limiting examples of vehicles for the colorant include propylene glycol monomethyl ether, diethylene glycol diethyl ether, dimethylacetamide, and toluene. Generally, such vehicles solidify at temperatures from 80° C. to 200° C. In some embodiments, the ink includes from 0.5%-6% by volume of the colorant and 94%-99.5% by volume of the vehicle.

Figure 13A:
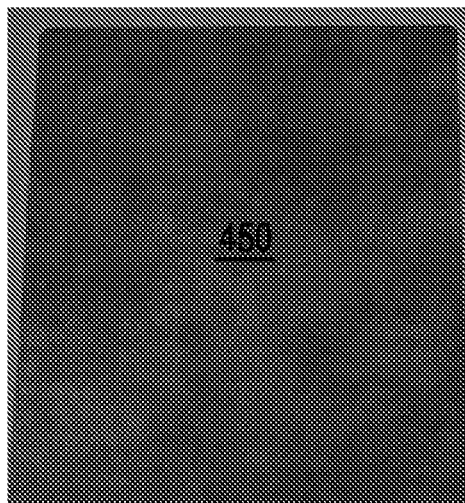
FIGS. 13A and 13B depict the front and back of a glass layer having a semi-transparent layer printed thereon.
Figure 14A:
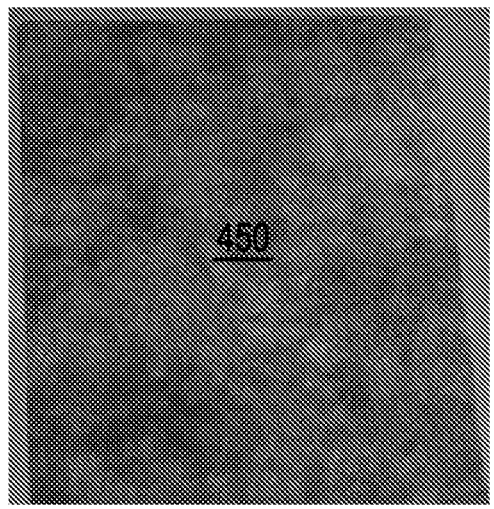
FIGS. 14A and 14B depict the front and back of a glass layer having a semi-transparent layer and contrast layer printed thereon, according to an exemplary embodiment.
Figure 13B:
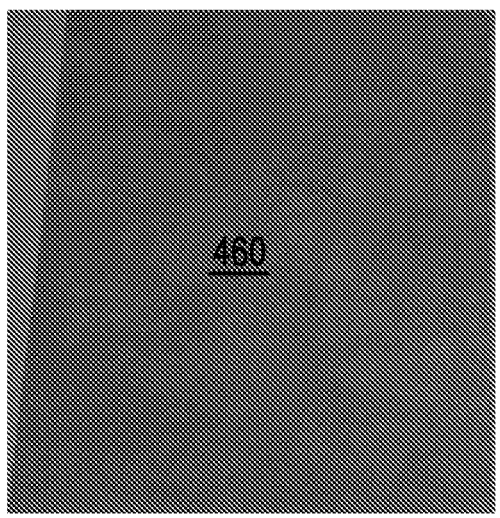
Figure 14B:
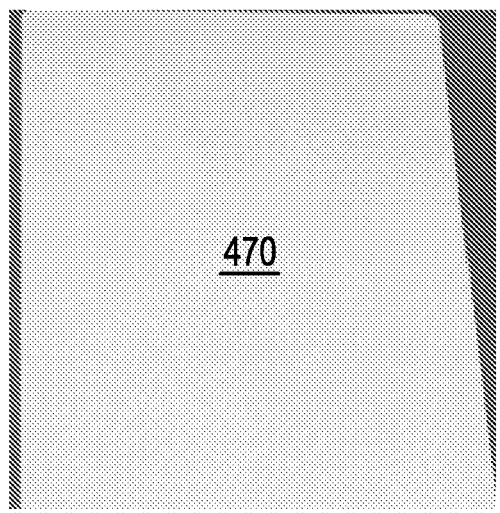

As shown in FIGS. 13A and 13B, a leather grain semi-transparent layer 460 was printed on to the substrate 450, specifically using an inkjet printer according to a CMYK color model (although, in other embodiments, other printer types and/or printing models are used). In FIGS. 14A and 14B, a white contrast layer 470 was printed behind the semi-transparent layer 460. FIGS. 13B and 14B depict the back sides of these printed layers. As can be seen in a comparison of FIGS. 13A and 14A, the contrast of the leather grain pattern of the semi-transparent layer 460 is enhanced by the white contrast layer 470 in FIG. 14A. Indeed, using the contrast layer 470, the overall appearance of the pattern or design in the semi-transparent layer 460 is brighter, and the contrast between the colors in the pattern or design is enhanced.

Figure 15:
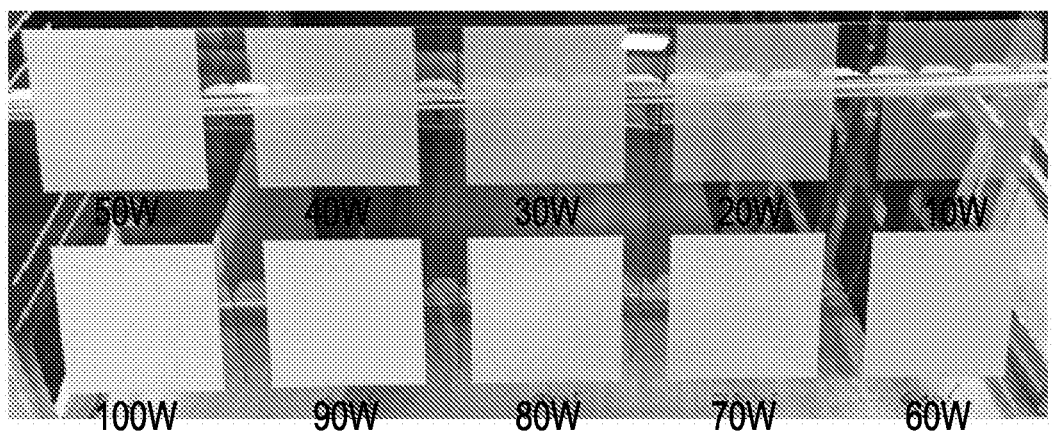
FIG. 15 depicts contrast layers of varying whiteness printed onto a glass sheet, according to an exemplary embodiment.
Figure 16:
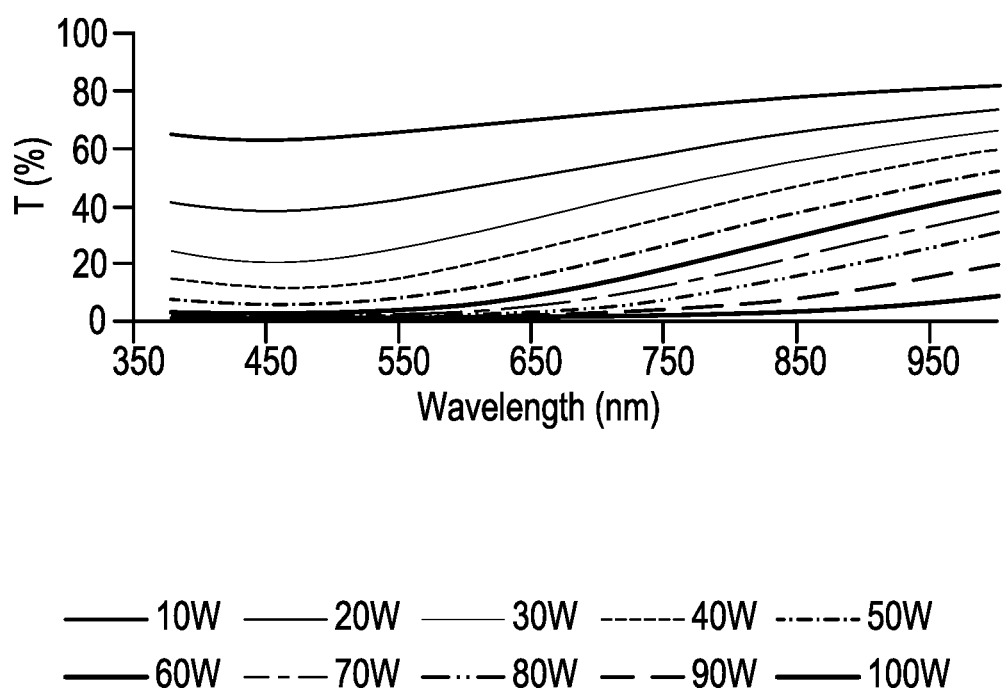
FIG. 16 is a graph of transmittance for contrast layers of varying transmittance, according to an exemplary embodiment.

The thickness and composition of the contrast layer 470 is tunable to exhibit a particular transmittance in the visible and infrared wavelength range. FIG. 15 depicts contrast layers 470 printed over a glass background. The contrast layers 470 are of varying whiteness (W). "Whiteness" as used herein refers to the CIE whiteness, or ISO 11475:2004, which measures the amount of light reflected by a white surface over the visible spectrum (wavelength of 400 nm to 700 nm). The lower left corner of FIG. 15 is a contrast layer of 100W. The whiteness of the contrast layer 470 decreases from 100W to 60W going left to right along the bottom row, and along the top row, whiteness decreases from 50W to 10W going left to right. As can be seen, relatively lower whiteness contrast layers 470 transmit more light than relatively higher whiteness contrast layer 470. This is also demonstrated in the transmittance (T) graph of FIG. 16. As the whiteness increases, the percent transmittance (% T) across the visible spectrum decreases. The data for generating the graph of FIG. 16 was calculated after printing white ink having diethylene glycol diethyl ether solvent and using a 128 nozzle, 40 pL printhead. The transmittance (T) is controlled through manipulation of printing resolution and layer thickness. In some embodiments, the deadfront article 400 is provided with a contrast layer 470 having a whiteness of between 10W and 60W. In other embodiments, the contrast layer 470 has a whiteness of between 20W and 50W. In a particular embodiment, the contrast layer 470 has a whiteness of between 20W and 30W.

Figure 17:
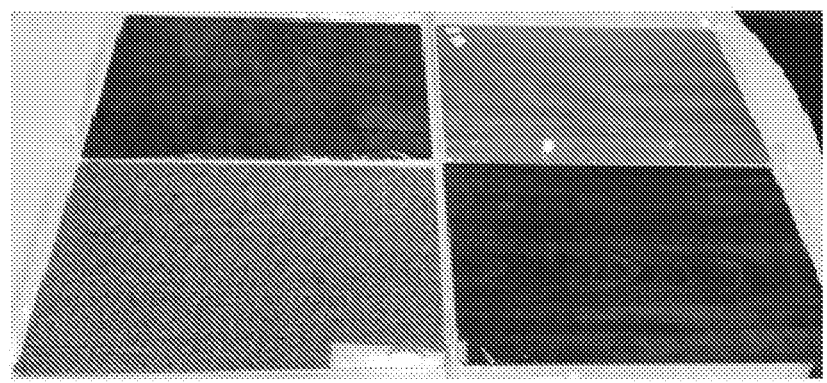
FIG. 17 depicts four differently-patterned semi-transparent layers for a deadfront article, according to an exemplary embodiment.
Figure 18:
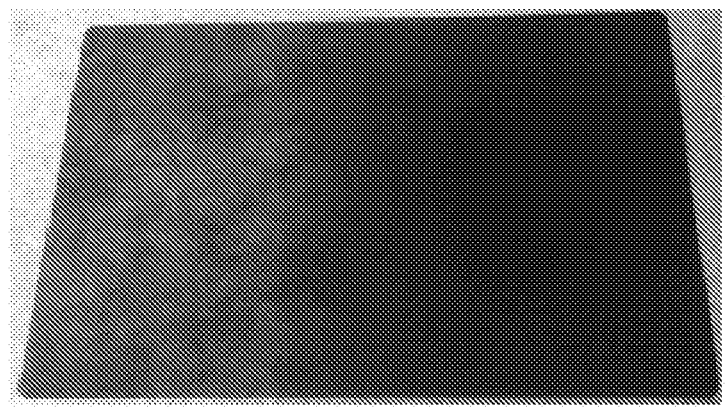
FIG. 18 depicts a deadfront article having a semi-transparent layer that transitions from leather grain to solid black, according to an exemplary embodiment.
Figure 19:
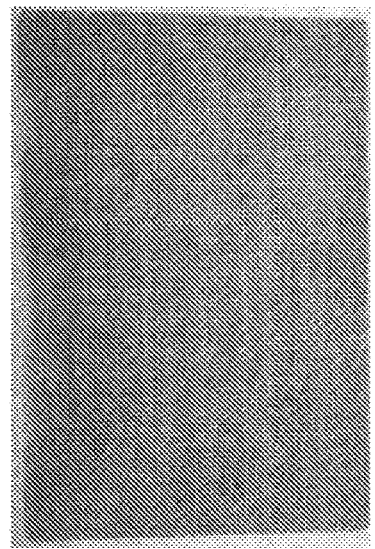
FIG. 19 depicts a knit-patterned semi-transparent layer for a deadfront article.
Figure 20:
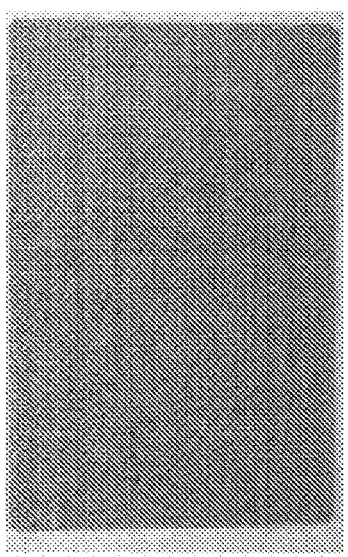
FIG. 20 depicts a knit-patterned semi-transparent layer for a deadfront article behind which a contrast layer is printed, according to an exemplary embodiment.
Figure 21:
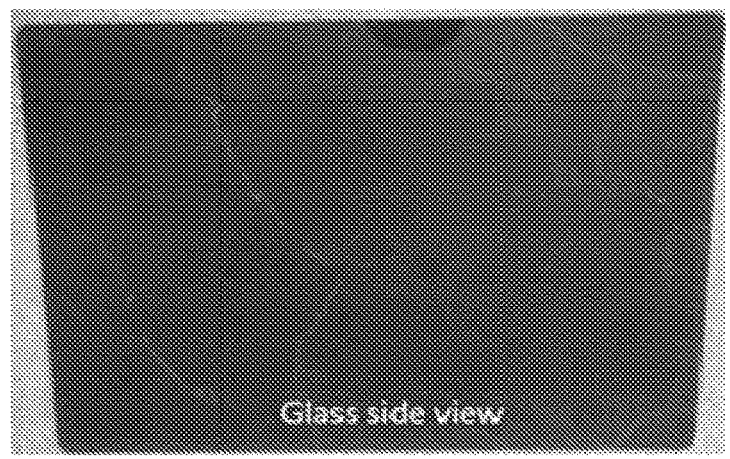
FIGS. 21 and 22 depict the front and back of a deadfront article having a marble-patterned semi-transparent layer with a window in the contrast layer, according to an exemplary embodiment.
Figure 22:
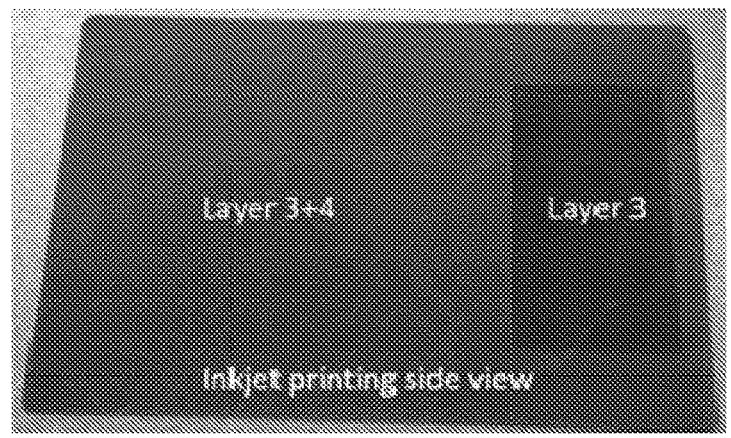

FIG. 17 depicts four glass substrates 450 having a semi-transparent layer 460 and contrast layer 470 printed thereon. As can be seen in FIG. 17, the semi-transparent layers 460 feature designs of a knitted fabric pattern, a leather grain pattern, and two wood grain patterns. FIG. 18 depicts a semi-transparent layer 460 that transitions from a leather grain pattern to a solid black pattern. In FIG. 18, a green power button is also printed in the lower left corner. FIGS. 19 and 20 provide a comparison between the same knitted fabric pattern semi-transparent layer 460. However, in FIG. 20, a contrast layer 470 was printed behind the semi-transparent layer 460. In FIG. 20, the deadfront article 400 has a transmittance of between 5% and 10% over the visible spectrum (wavelength of 400 nm to 700 nm). FIGS. 21 and 22 depict a marble deadfront article 400. In particular, FIG. 21 is the viewer side of the deadfront article 400, whereas FIG. 22 is the rear side of the deadfront article 400. As can be seen in FIG. 22, a section of the semi-transparent layer 460 is not covered with the contrast layer 470. In some embodiments, a display could be mounted to the section not covered by the contrast layer 470.

Referring to FIGS. 23-27, various sizes, shapes, curvatures, glass materials, etc. for a glass-based deadfront article along with various processes for forming a curved glass-based deadfront are shown and described. It should be understood, that while FIGS. 23-27 are described in the context of a simplified curved deadfront article 2000 for ease of explanation, deadfront article 2000 may be any of the deadfront embodiments discussed herein.

Figure 23:
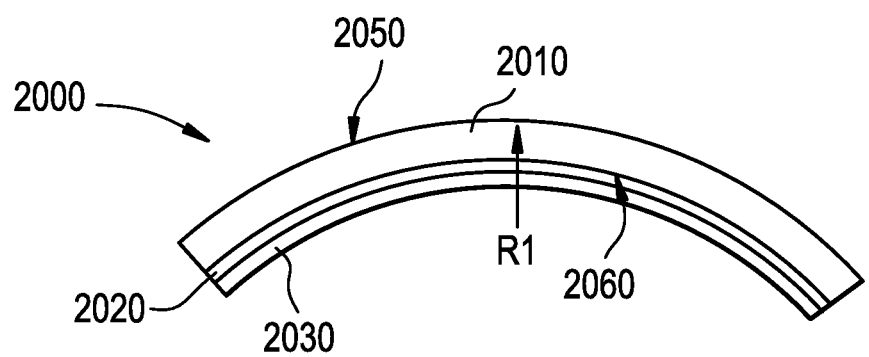
FIG. 23 is a side view of a curved glass deadfront article for use with a display, according to an exemplary embodiment.

As shown in FIG. 23, in one or more embodiments, deadfront article 2000 includes a curved outer glass substrate 2010 having at least a first radius of curvature, R1, and in various embodiments, curved outer glass substrate 2010 is a complex curved sheet of glass material having at least one additional radius of curvature. In various embodiments, R1 is in a range from about 60 mm to about 1500 mm.

Curved deadfront article 2000 includes a deadfront colored layer 2020 (e.g., the ink/pigment layer(s), as discussed above) located along an inner, major surface of curved outer glass substrate 2010. In general, deadfront colored layer 2020 is printed, colored, shaped, etc. to provide a wood-grain design, a leather-grain design, a fabric design, a brushed metal design, a graphic design, a solid color and/or a logo. However, embodiments of the invention are not limited to these designs or patterns. Curved deadfront article 2000 also may include any of the additional layers 2030 (e.g., high optical density layers, light guide layers, reflector layers, display module(s), display stack layers, light sources, touch panels, etc.) as discussed above or that otherwise may be associated with a display or vehicle interior system as discussed herein.

As will be discussed in more detail below, in various embodiments, curved deadfront article 2000 including glass substrate 2010 and colored layer 2020 may be cold-formed together to a curved shape, as shown in FIG. 23. In some embodiments, curved deadfront article 2000 including glass substrate 2010, colored layer 2020 and additional layers 2030 may be cold-formed together to a curved shape, such as that shown in FIG. 23. In other embodiments, glass substrate 2010 may be formed to a curved shape, and then layers 2020 and 2030 are applied following curve formation.

Figure 24:
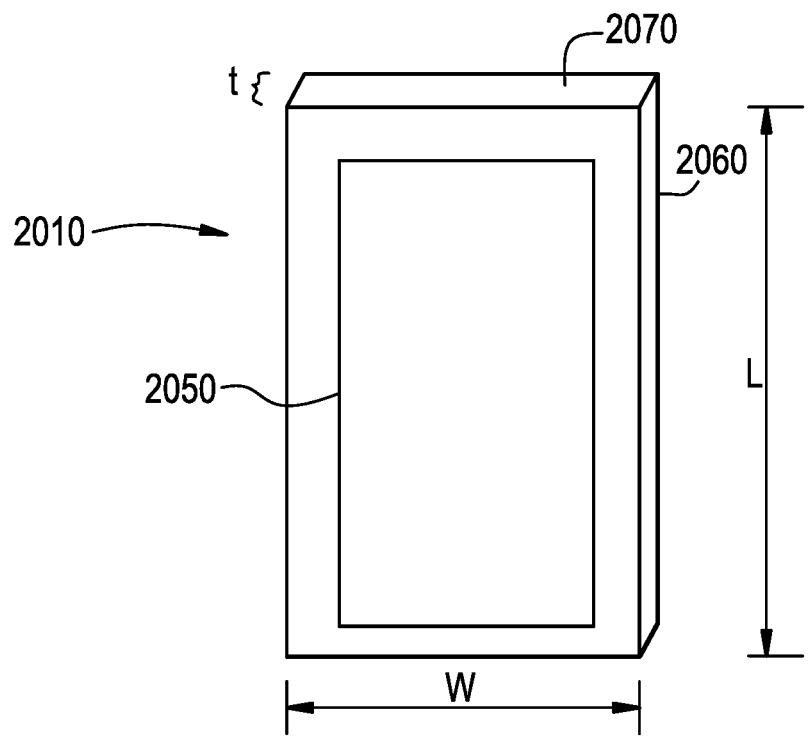
FIG. 24 is a front perspective view of a glass layer for the glass deadfront article of FIG. 6 prior to curve formation, according to an exemplary embodiment.

Referring to FIG. 24, outer glass substrate 2010 is shown prior to being formed to the curved shape shown in FIG. 24. In general, the articles and processes discussed herein provide high quality deadfront articles utilizing glass of sizes, shapes, compositions, strengths, etc. not previously provided.

As shown in FIG. 24, outer glass substrate 2010 includes a first major surface 2050 and a second major surface 2060 opposite first major surface 2050. An edge surface or minor surface 2070 connects the first major surface 2050 and the second major surface 2060. Outer glass substrate 2010 has a thickness (t) that is substantially constant and is defined as a distance between the first major surface 2050 and the second major surface 2060. In some embodiments, the thickness (t) as used herein refers to the maximum thickness of the outer glass substrate 2010. Outer glass substrate 2010 includes a width (W) defined as a first maximum dimension of one of the first or second major surfaces orthogonal to the thickness (t), and outer glass substrate 2010 also includes a length (L) defined as a second maximum dimension of one of the first or second surfaces orthogonal to both the thickness and the width. In other embodiments, the dimensions discussed herein are average dimensions.

In one or more embodiments, outer glass substrate 2010 has a thickness (t) that is in a range from 0.05 mm to 2 mm. In various embodiments, outer glass substrate 2010 has a thickness (t) that is about 1.5 mm or less. For example, the thickness may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, outer glass substrate 2010 has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, outer glass substrate 2010 has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm.

As shown in FIG. 23, outer glass substrate 2010 is shaped to a curved shaping having at least one radius of curvature, shown as R1. In various embodiments, outer glass substrate 2010 may be shaped to the curved shape via any suitable process, including cold-forming and hot-forming.

In specific embodiments, outer glass substrate 2010 is shaped to the curved shape shown in FIG. 23, either alone, or following attachment of layers 2020 and 2030, via a cold-forming process. As used herein, the terms "cold-bent," "cold-bending," "cold-formed" or "cold-forming" refers to curving the glass substrate at a cold-form temperature which is less than the softening point of the glass (as described herein). A feature of a cold-formed glass substrate is an asymmetric surface compressive between the first major surface 2050 and the second major surface 2060. In some embodiments, prior to the cold-forming process or being cold-formed, the respective compressive stresses in the first major surface 2050 and the second major surface 2060 are substantially equal.

In some such embodiments in which outer glass substrate 2010 is unstrengthened, the first major surface 2050 and the second major surface 2060 exhibit no appreciable compressive stress, prior to cold-forming. In some such embodiments in which outer glass substrate 2010 is strengthened (as described herein), the first major surface 2050 and the second major surface 2060 exhibit substantially equal compressive stress with respect to one another, prior to cold-forming. In one or more embodiments, after cold-forming (shown, for example, in FIG. 23) the compressive stress on the second major surface 2060 (e.g., the concave surface following bending) increases (i.e., the compressive stress on the second major surface 2050 is greater after cold-forming than before cold-forming).

Without being bound by theory, the cold-forming process increases the compressive stress of the glass substrate being shaped to compensate for tensile stresses imparted during bending and/or forming operations. In one or more embodiments, the cold-forming process causes the second major surface 2060 to experience compressive stresses, while the first major surface 2050 (e.g., the convex surface following bending) experiences tensile stresses. The tensile stress experienced by surface 2050 following bending results in a net decrease in surface compressive stress, such that the compressive stress in surface 2050 of a strengthened glass sheet following bending is less than the compressive stress in surface 2050 when the glass sheet is flat.

Further, when a strengthened glass substrate is utilized for outer glass substrate 2010, the first major surface and the second major surface (2050,2060) are already under compressive stress, and thus first major surface 2050 can experience greater tensile stress during bending without risking fracture. This allows for the strengthened embodiments of outer glass substrate 2010 to conform to more tightly curved surfaces (e.g., shaped to have smaller R1 values).

In various embodiments, the thickness of outer glass substrate 2010 is tailored to allow outer glass substrate 2010 to be more flexible to achieve the desired radius of curvature. Moreover, a thinner outer glass substrate 2010 may deform more readily, which could potentially compensate for shape mismatches and gaps that may be created by the shape of a support or frame (as discussed below). In one or more embodiments, a thin and strengthened outer glass substrate 2010 exhibits greater flexibility especially during cold-forming. The greater flexibility of the glass substrate discussed herein may allow for consistent bend formation without heating.

In various embodiments, outer glass substrate 2010 (and consequently deadfront article 2000) may have a compound curve including a major radius and a cross curvature. A complexly curved cold-formed outer glass substrate 2010 may have a distinct radius of curvature in two independent directions. According to one or more embodiments, the complexly curved cold-formed outer glass substrate 2010 may thus be characterized as having "cross curvature," where the cold-formed outer glass substrate 2010 is curved along an axis (i.e., a first axis) that is parallel to a given dimension and also curved along an axis (i.e., a second axis) that is perpendicular to the same dimension. The curvature of the cold-formed outer glass substrate 2010 can be even more complex when a significant minimum radius is combined with a significant cross curvature, and/or depth of bend.

Figure 25:
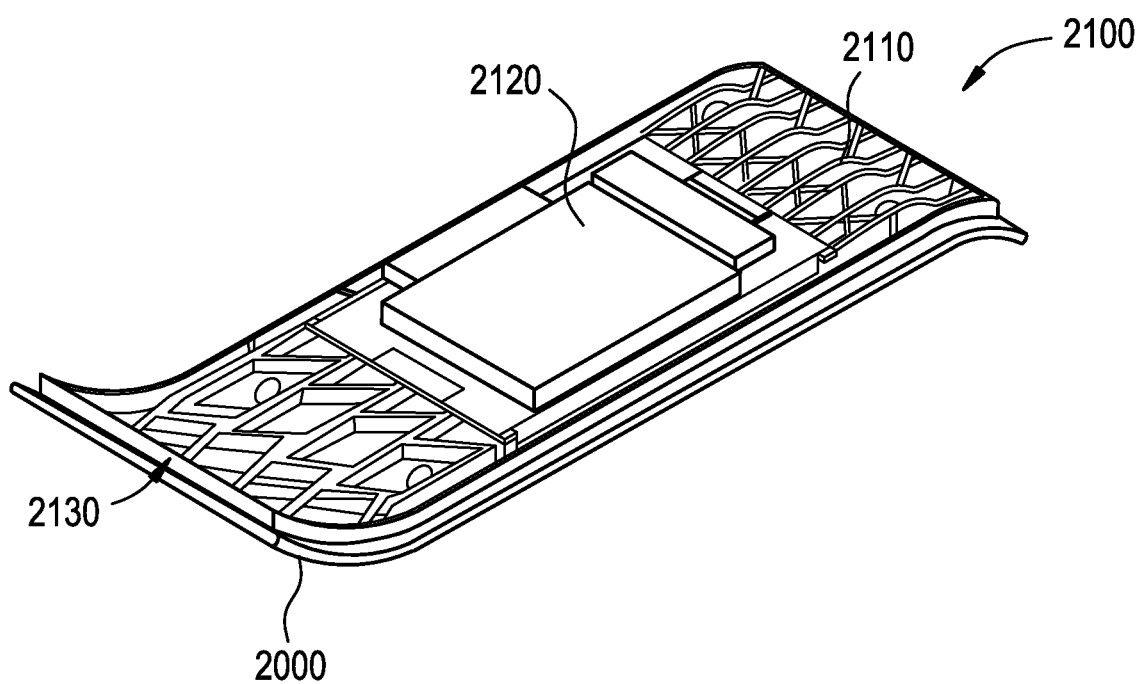
FIG. 25 shows a curved deadfront article including a glass layer shaped to conform to a curved display frame, according to an exemplary embodiment.

Referring to FIG. 25, display assembly 2100 is shown according to an exemplary embodiment. In the embodiment shown, display assembly 2100 includes frame 2110 supporting (either directly or indirectly) both a light source, shown as a display module 2120, and deadfront article 2000. As shown in FIG. 25, deadfront article 2000 and display module 2120 are coupled to frame 2110, and display module 2120 is positioned to allow a user to view light, images, etc. generated by display module 2120 through deadfront article 2000. In various embodiments, frame 2110 may be formed from a variety of materials such as plastic (PC/ABS, etc.), metals (Al-alloys, Mg-alloys, Fe-alloys, etc.). Various processes such as casting, machining, stamping, injection molding, etc. may be utilized to form the curved shape of frame 2110. While FIG. 25 shows a light source in the form of a display module, it should be understood that display assembly 2100 may include any of the light sources discussed herein for producing graphics, icons, images, displays, etc. through any of the dead front embodiments discussed herein. Further, while frame 2110 is shown as a frame associated with a display assembly, frame 2110 may be any support or frame article associated with a vehicle interior system.

In various embodiments, the systems and methods described herein allow for formation of deadfront article 2000 to conform to a wide variety of curved shapes that frame 2110 may have. As shown in FIG. 25, frame 2110 has a support surface 2130 that has a curved shape, and deadfront article 2000 is shaped to match the curved shape of support surface 2130. As will be understood, deadfront structure 2000 may be shaped into a wide variety of shapes to conform to a desired frame shape of a display assembly 2100, which in turn may be shaped to fit the shape of a portion of a vehicle interior system, as discussed herein.

In one or more embodiments, deadfront structure 2000 (and specifically outer glass substrate 2010) is shaped to have a first radius of curvature, R1, of about 60 mm or greater. For example, R1 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, support surface 2130 has a second radius of curvature of about 60 mm or greater. For example, the second radius of curvature of support surface 2130 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, deadfront structure 2000 is cold-formed to exhibit a first radius curvature, R1, that is within 10% (e.g., about 10% or less, about 9% or less, about 8% or less, about 7% or less, about 6% or less, or about 5% or less) of the second radius of curvature of support surface 2130 of frame 2110. For example, support surface 2130 of frame 2110 exhibits a radius of curvature of 1000 mm, deadfront article 2000 is cold-formed to have a radius of curvature in a range from about 900 mm to about 1100 mm.

In one or more embodiments, first major surface 2050 and/or second major surface 2060 of glass substrate 2010 includes a functional coating layer as described herein. The functional coating layer may cover at least a portion of first major surface 2050 and/or second major surface 2060. Exemplary functional coatings include at least one of a glare reduction coating or surface, an anti-glare coating or surface, a scratch resistance coating, an anti-reflection coating, a half-mirror coating, or easy-to-clean coating.

Figure 26:
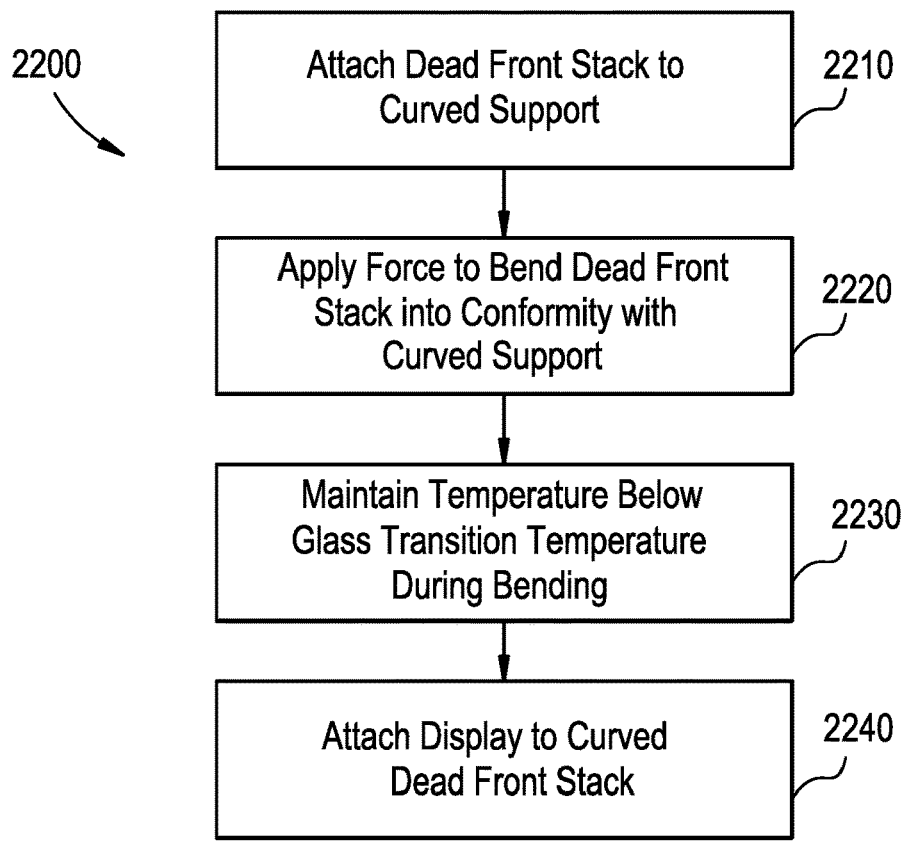
FIG. 26 shows a process for cold forming a deadfront article including a glass layer to a curved shape, according to an exemplary embodiment.

Referring to FIG. 26, a method 2200 for forming a display assembly that includes a cold-formed deadfront article, such as deadfront article 2000 is shown. At step 2210, the method includes curving a deadfront article, such deadfront article 2000, to a curved surface of a support. In general, the support may be a frame of a display, such as frame 2110 that defines a perimeter and curved shape of a vehicle display. In general, the frame includes a curved support surface, and one of the major surfaces 2050 and 2060 of deadfront article 2000 is placed into contact with the curved support surface.

At step 2220, the method includes securing the curved deadfront article to the support causing the deadfront article to bend into conformity (or conform) with the curved surface of the support. In this manner, a curved deadfront article 2000, as shown in FIG. 23, is formed from a generally flat deadfront article to a curved deadfront article. In this arrangement, curving the flat deadfront article forms a curved shape on the major surface facing the support, while also causing a corresponding (but complimentary) curve to form in the major surface opposite of the frame. By bending the deadfront article directly on the curved frame, the need for a separate curved die or mold (typically needed in other glass bending processes) may be eliminated. Further, by shaping the deadfront directly to the curved frame, a wide range of curved radii may be achieved in a low complexity manufacturing process.

In some embodiments, the force applied in step 2210 and/or step 2220 may be air pressure applied via a vacuum fixture. In some other embodiments, the air pressure differential is formed by applying a vacuum to an airtight enclosure surrounding the frame and the deadfront article. In specific embodiments, the airtight enclosure is a flexible polymer shell, such as a plastic bag or pouch. In other embodiments, the air pressure differential is formed by generating increased air pressure around the deadfront article and the frame with an overpressure device, such as an autoclave. Air pressure provides a consistent and highly uniform bending force (as compared to a contact-based bending method) which further leads to a robust manufacturing process. In various embodiments, the air pressure differential is between 0.5 and 1.5 atmospheres of pressure (atm), specifically between 0.7 and 1.1 atm, and more specifically is 0.8 to 1 atm.

At step 2230, the temperature of the deadfront article is maintained below the glass transition temperature of the material of the outer glass layer during steps 2210 and 2220. As such, method 2200 is a cold-forming or cold-bending process. In particular embodiments, the temperature of the deadfront article is maintained below 500 degrees C., 400 degrees C., 300 degrees C., 200 degrees C. or 100 degrees C. In a particular embodiment, the deadfront article is maintained at or below room temperature during bending. In a particular embodiment, the deadfront article is not actively heated via a heating element, furnace, oven, etc. during bending, as is the case when hot-forming glass to a curved shape.

As noted above, in addition to providing processing advantages such as eliminating expensive and/or slow heating steps, the cold-forming processes discussed herein are believed to generate curved deadfront articles with a variety of properties that are believed to be superior to those achievable via hot-forming processes. For example, for at least some glass materials, heating during hot-forming processes decreases optical properties of curved glass substrates, and thus, the curved glass-based deadfront articles formed utilizing the cold-bending processes/systems discussed herein provide for both curved glass shape along with improved optical qualities not believed achievable with hot-bending processes.

Further, many materials used for the various coatings and layers (e.g., easy-to-clean coatings, anti-reflective coatings, etc.) are applied via deposition processes, such as sputtering processes that are typically ill-suited for coating on to a curved surface. In addition, many coating materials, such as the deadfront ink/pigment materials, also are not able to survive the high temperatures associated with hot-bending processes. Thus, in particular embodiments discussed herein, layer 2020 is applied to outer glass substrate 2010 prior to cold-bending Thus, the processes and systems discussed herein allow for bending of glass after one or more coating material has been applied to the glass, in contrast to typical hot-forming processes.

At step 2220, the curved deadfront article is attached or affixed to the curved support. In various embodiments, the attachment between the curved deadfront article and the curved support may be accomplished via an adhesive material. Such adhesives may include any suitable optically clear adhesive for bonding the deadfront article in place relative to the display assembly (e.g., to the frame of the display). In one example, the adhesive may include an optically clear adhesive available from 3M Corporation under the trade name 8215. The thickness of the adhesive may be in a range from about 200 μm to about 500 μm.

The adhesive material may be applied in a variety of ways. In one embodiment, the adhesive is applied using an applicator gun and made uniform using a roller or a draw down die. In various embodiments, the adhesives discussed herein are structural adhesives. In particular embodiments, the structural adhesives may include an adhesive selected from one or more of the categories: (a) Toughened Epoxy (Masterbond EP21TDCHT-LO, 3M Scotch Weld Epoxy DP460 Off-white); (b) Flexible Epoxy (Masterbond EP21TDC-2LO, 3M Scotch Weld Epoxy 2216 B/A Gray); (c) Acrylic (LORD Adhesive 410/Accelerator 19 w/LORD AP 134 primer, LORD Adhesive 852/LORD Accelerator 25GB, Loctite HF8000, Loctite AA4800); (d) Urethanes (3M Scotch Weld Urethane DP640 Brown); and (e) Silicones (Dow Corning 995). In some cases, structural glues available in sheet format (such as B-staged epoxy adhesives) may be utilized. Furthermore, pressure sensitive structural adhesives such as 3M VHB tapes may be utilized. In such embodiments, utilizing a pressure sensitive adhesive allows for the curved deadfront article to be bonded to the frame without the need for a curing step.

In one or more embodiments, the method includes step 2240 in which the curved deadfront is secured to a display. In one or more embodiments, the method may include securing the display to the deadfront article before step 2210 and curving both the display and the deadfront article in step 2210. In one or more embodiments, the method includes disposing or assembling the curved deadfront and display in a vehicle interior system 100, 200, 300.

Figure 27:
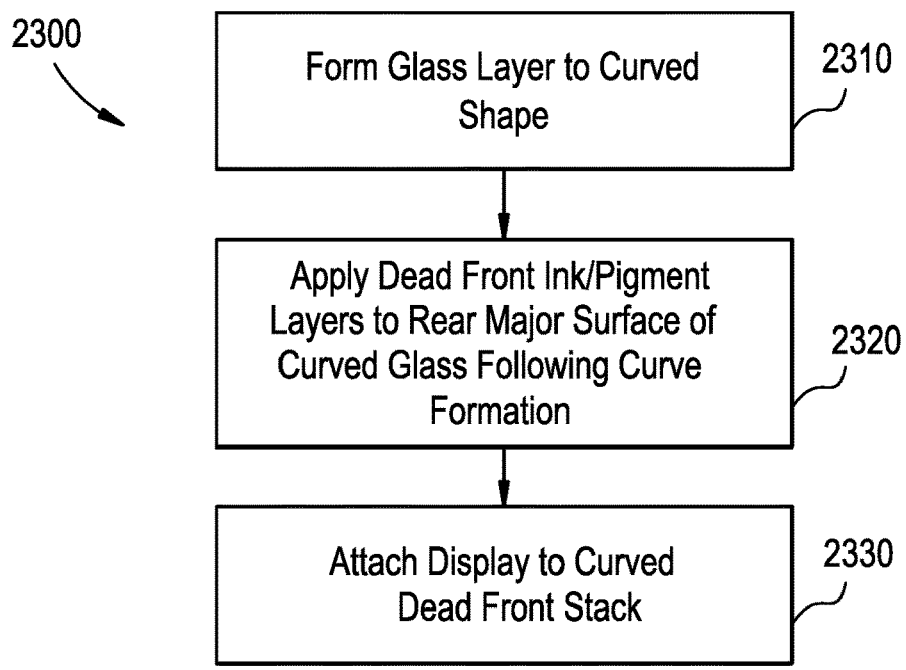
FIG. 27 shows a process for forming a curved deadfront article including a curved glass layer, according to an exemplary embodiment.

Referring to FIG. 27, method 2300 for forming a display utilizing a curved deadfront article is shown and described. In some embodiments, the substrate (e.g., outer glass layer 2010) of a deadfront article is formed to curved shape at step 2310. Shaping at step 2310 may be either cold-forming or hot-forming. At step 2320, the deadfront ink/pigment layer(s) (e.g., layer 2020) is applied to the substrate following shaping to provide a curved deadfront article. Next at step 2330, the curved deadfront article is attached to a frame, such as frame 2110 of display assembly 2100, or other frame that may be associated with a vehicle interior system.

Substrate Materials

The various substrates of the deadfront articles discussed herein may be formed from any transparent material such as a polymer (e.g., PMMA, polycarbonate and the like) or glass. Suitable glass compositions include soda lime glass, aluminosilicate glass, borosilicate glass, boroaluminosilicate glass, alkali-containing aluminosilicate glass, alkali-containing borosilicate glass, and alkali-containing boroaluminosilicate glass.

In some embodiments, a substrate discussed herein may be formed of a "glass-ceramic" material produced through controlled crystallization of glass. In such embodiments, glass-ceramics have about 30% to about 90% crystallinity. Non-limiting examples of glass ceramic systems that may be used include $Li_2O \times Al_2O_3 \times nSiO_2$ (i.e. LAS system), $MgO \times Al_2O_3 \times nSiO_2$ (i.e. MAS system), and $ZnO \times Al_2O_3 \times nSiO_2$ (i.e. ZAS system).

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, glass layer(s) herein are described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$. In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Strengthened Substrate

In one or more embodiments, the substrate includes a glass material (such as outer glass substrate 2010 or other glass substrate) of any of the deadfront article embodiments discussed herein. In one or more embodiments, such glass substrates may be strengthened. In one or more embodiments, the glass substrate may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass substrates used in the deadfront articles discussed herein may be strengthened mechanically by utilizing a mismatch of the coefficient of thermal expansion between portions of the glass to create a compressive stress region and a central region exhibiting a tensile stress. In some embodiments, the glass substrate may be strengthened thermally by heating the glass to a temperature above the glass transition point and then rapidly quenching.

In one or more embodiments, the glass substrate used in the deadfront articles discussed herein may be chemically strengthened by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass or soda lime silicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the substrate and any crystalline phases present) and the desired DOC and CS of the substrate that results from strengthening.

Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on the glass thickness, bath temperature and glass (or monovalent ion) diffusivity. However, temperatures and immersion times different from those described above may also be used.

In one or more embodiments, the glass substrate used to in the deadfront articles may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrate of a deadfront article may be immersed in a molten mixed salt bath including from about 5% to about 90% $KNO_3$ and from about 10% to about 95% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate used to form the deadfront articles may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass substrate of a deadfront article. The spike may result in a greater surface CS value. This spike can be achieved by single bath or multiple baths, with the bath(s) having a single composition or mixed composition, due to the unique properties of the glass compositions used in the glass substrate of a deadfront article described herein.

In one or more embodiments, where more than one monovalent ion is exchanged into the glass substrate used in the deadfront articles, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four-point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrate is measured by FSM. Central tension or CT is the maximum tensile stress and is measured by SCALP.

In one or more embodiments, the glass substrate used to form the deadfront articles maybe strengthened to exhibit a DOC that is described a fraction of the thickness t of the glass substrate (as described herein). For example, in one or more embodiments, the DOC may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, The DOC may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm.

In one or more embodiments, the glass substrate used to form the deadfront articles may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the glass substrate used to form the deadfront articles may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

Tactile Elements

FIGS. 37-40 illustrate a substrate 700 including one or more tactile elements. Substrate 700 includes a first surface 702, a second surface 704 opposite first surface 702, and at least one edge surface 706 extending between first and second surfaces 702, 704. An article (e.g., deadfront article 400) that includes substrate 700 may include an outer surface (e.g., outer surface 480) defined by first surface 702 of substrate 700. Thus, the user of the article may both see and touch first surface 702 of substrate 700 when interacting with the article.

Substrate 700 includes at least one visual element 710-1, 710-2 disposed on second surface 704 of substrate 700 such that the at least one visual element may be viewed through first surface 702 thereof. Additionally and/or alternatively, at least one visual element 710-1, 710-2 may be disposed within the substrate 700 using known techniques (e.g., using pigmented glass, etc.). Visual element(s) 710-1, 710-2 may be or may include one or more graphics visible through first surface 702. In some embodiments, the one or more graphics may include one or more icons.

In some embodiments, at least one visual element 710-1, 710-2 may be defined in whole or in part by an opaque layer (e.g., opaque layer 510). In some embodiments, the opaque layer may be provided to outline backlit icons and/or other graphics (such as the graphic 410 and/or power button 420 shown in FIGS. 2 and 3, the icons 430 shown in FIG. 5, or the graphics 820 shown in FIG. 41). Thus, in some embodiments, the opaque layer has interruptions in the layer that define visual element(s) 710-1, 710-2. In such embodiments, opaque layer 510 may be a masking layer that defines visual element(s) 710-1, 710-2.

Visual element(s) 710-1, 710-2 may include one or more visual portions arranged into at least one of: (i) one or more areas of color, (ii) one or more lines, (iii) one or more patterns, (iv) one or more designs, (v) one or more images, (vi) one or more graphics, and (vii) one or more combinations thereof. By way of example only, a first visual element 710-1 may be a circle formed via color, lines, patterns, shading, masking, design, etc., and a second visual element 710-2 may be a triangle formed via color, lines, patterns, shading, masking, design, etc. Those skilled in the art will appreciate that the particular artistic elements comprised within visual element(s) 710-1, 710-2 are numerous, and the illustrated examples are not limiting.

In some embodiments, visual element(s) 710-1, 710-2 may be disposed on second surface 704 of substrate 700, serving as an inner surface of an article (e.g., inner surface 490 of deadfront article 400). Thus, visual element(s) 710-1, 710-2 may be seen by the user through first surface 702 of substrate 700 but the visual element(s) 710-1, 710-2 are protected from wear or damage by way of being disposed on second surface 704 of substrate 700. As noted above, additional and/or alternative embodiments may include the at least one visual element 710-1, 710-2 disposed within substrate 700.

Figure 37:
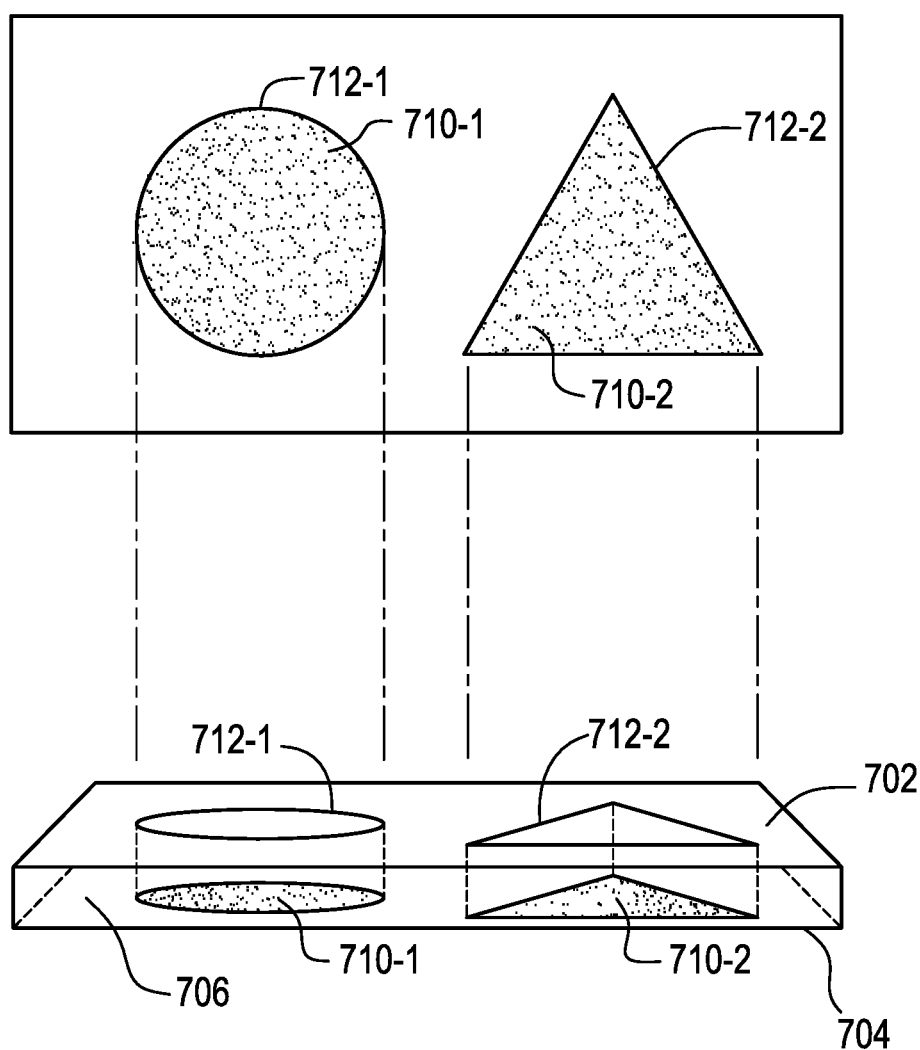
FIG. 37 depicts a top view and a perspective view of a substrate article having both visual and tactile features.

As illustrated in FIG. 37, substrate 700 includes at least one tactile element 712-1, 712-2. As will be explained herein, the combination of the at least one visual element 710-1, 710-2 and the at least one tactile element 712-1, 712-2 may be combined in such a way as to enhance the look and/or the feel of an article. For example, tactile element(s) 712-1, 712-2 may enhance the feel of the article in the user's hand or the feel of an article's surface. In some embodiments, the tactile element(s) 712-1, 712-2 may also operate in such a way that visual element(s) 710-1, 710-2 is/are visually enhanced as compared to an article without tactile element(s) 712-1, 712-2. For example, a notably visually stimulating (depth and/or three-dimensional) effect has been discovered by providing visual element(s) 710-1, 710-2 on second surface 704 of substrate 700 and providing tactile element(s) 712-1, 712-2 in a complimentary fashion on first surface 702 of substrate 700. A similar affect may be achieved for visual elements(s) 710-1, 710-2 disposed within substrate 700. In this regard, the complimentary nature of providing at least one tactile element 712-1, 712-2 may include providing one or more portions of surface roughness and/or small surface elements that complement the color(s), line(s), pattern(s), design(s), graphics, and/or image(s), etc. of at least one visual element 710-1, 710-2.

A surface roughness discussed herein may be quantified, for example, as exhibiting an $R_a$ surface roughness of between about 10 nm and about 80 nm for a relatively smooth surface roughness (including subranges), between about 80 nm and about 300 nm for a relatively moderate surface roughness (including subranges), and greater than about 300 nm for a relatively rough surface roughness. For example, a relatively smooth surface roughness may have a $R_a$ surface roughness of 10 nm, 20 nm, 30 nm, 40 nm, 50 nm, 60 nm, 70 nm, 80 nm, or a $R_a$ surface roughness in a range having any two of these values as endpoints. As another example, a relatively moderate surface roughness may have a $R_a$ surface roughness of 80 nm, 100 nm, 125 nm, 150 nm, 175 nm, 200 nm, 225 nm, 250 nm, 275 nm, or 300 nm, or $R_a$ surface roughness in a range having any two of these values as endpoints. The height difference characteristics of the small surface elements discussed herein may be implemented via relatively small elements extending away from a surface of the substrate and may be quantified, for example, as having a height of between about 10 nm and about 80 nm for a relatively smooth surface roughness, between about 80 nm and about 300 nm for a relatively moderate surface roughness, and greater than about 300 nm for a relatively rough surface roughness.

A surface roughness ($R_a$) is defined as the arithmetic average of the differences between the local surface heights and the average surface height and can be described by the Equation (1):

$$R_a = \frac{1}{n}\sum_{i=1}^{n} |y_i| \qquad \text{Equation (1)}$$

where $y_i$ is the local surface height relative to the average surface height where the surface roughness ($R_a$) in at least three sample areas (n) of about 100 μm by 100 μm are measured and averaged. Surface roughness ($R_a$) may be measured using a surface profilometer available from Zygo Corp.

The aforementioned provision of providing at least one tactile element 712-1, 712-2 in a commentary fashion to at least one visual element 710-1, 710-2 may include providing lines, areas, designs, shapes, patterns, etc. of surface roughness and/or small surface elements on first surface 702 of the substrate 700 that substantially match (e.g., are in registration with) corresponding lines, shapes, patterns, graphics, colors, etc. of at least one visual element 710-1, 710-2.

As used herein, two objects disposed or positioned in a "complimentary fashion" means that the two objects have substantially the same overall shape, perimeter shape, design, and/or pattern, and occupy substantially the same relative surface area on opposing surfaces of a substrate. In embodiments including an object formed within a substrate (e.g., a visual element disposed within a substrate), the overall shape, perimeter shape, design, and/or pattern, and the relative surface area of such an object is the overall shape, perimeter shape, design, and/or pattern, and surface area of that object projected onto a surface of the substrate opposite the surface on which the corresponding object is disposed or positioned in a complimentary fashion. FIG. 37 illustrates a first visual element 710-1 positioned on second surface 704 in a complementary fashion to a first tactile element 712-1 on first surface 702 of substrate 700. Similarly, FIG. 37 illustrates a second visual element 710-2 positioned on second surface 704 in a complementary fashion to a second tactile element 712-2 on first surface 702 of substrate 700.

In some embodiments, desirable visual effects may be obtained without disposing objects in a complementary fashion. In some embodiments, at least one tactile element 712-1, 712-2 may be disposed in a non-commentary fashion (e.g., offset fashion) to at least one visual element 710-1, 710-2 to produce desirable visual effect.

Tactile element(s) 712-1, 712-2 include one or more surface roughness portions and/or small surface elements arranged into at least one of: (i) one or more areas of surface roughness and/or small surface elements, (ii) one or more lines of surface roughness and/or small surface elements, (iii) one or more patterns of surface roughness and/or small surface elements, (iv) one or more designs of surface roughness and/or small surface elements, and (v) one or more combinations thereof. By way of example only, first tactile element 712-1 may be a circle formed via a line of elevated surface roughness and/or small surface elements, or a line of reduced surface roughness and/or small surface elements, and second tactile element 712-2 may be a triangle formed via a line of elevated surface roughness and/or small surface elements, or a line of reduced surface roughness and/or small surface elements. Again, those skilled in the art will appreciate that the particular artistic elements comprised within tactile element(s) 712-1, 712-2 are numerous.

As will be discussed herein, tactile element(s) 712-1, 712-2 may be applied to first surface 702 of substrate 700 in such a way that first surface 702 serves as an outer surface of an article. First surface 702 of substrate 700 may be subject to surface processing in order to provide some level of surface roughening (e.g., a hazing effect) that provides some tactile feedback to the user. As described herein, the level of surface roughness and/or small surface elements may range from a feeling of smooth (very little or no surface roughness and/or small surface elements), to a feeling of velvety softness (moderate levels of surface roughness, such as a matte surface roughness, and/or moderate levels of small surface elements), to a feeling of substantial roughness (higher levels of roughness and/or small surface elements) in order to achieve design goals.

As shown in FIG. 37, at least some of the surface roughness portions (and/or small surface element portions) of tactile element(s) 712-1, 712-2 are positioned on first surface 702 of substrate 700 in a complimentary fashion with respect to at least some of the visual portions of visual element(s) 710-1, 710-2. Such an arrangement may modify the visual effect of the visual element(s) 710-1, 710-2 as viewed through first surface 702 of substrate 700. For example, in some configurations, the complementary arrangement may provide a three-dimensional visual effect, particularly at some viewing angles.

In this example, first tactile element 712-1 positioned in a complimentary fashion to first visual element 710-1 may be achieved via a first surface roughness portion (and/or small surface element portion) of first tactile element 712-1 in the form of a line (e.g., a circular outline) of complementary size and shape as the circle of first visual element 710-1. Similarly, second tactile element 712-2 positioned in a complimentary fashion to second visual element 710-2 may be achieved via a second surface roughness portion (and/or small surface element portion) of second tactile element 712-2 in the form of a line (e.g., a triangular outline) of complementary size and shape as the triangle of second visual element 710-2.

The surface roughness portions (and/or small surface element portions) of tactile element(s) 712-1, 712-2 may be achieved in any number of ways. For example, the surface roughness portions (and/or small surface element portion) may be defined by an area (e.g., a circle, a triangle, a circular and/or triangular area) of relatively higher surface roughness (and/or higher surface element height) that is positioned in the visually complimentary fashion with respect to corresponding visual element(s) 710-1 and/or 710-2 bordered by at least one area of relatively lower surface roughness (and/or lower surface element height). One way of achieving such an effect is to provide: (i) a majority of a total surface area of first surface 702 of substrate 700 as a relatively smooth finish of relatively low surface roughness (e.g., ranging from no surface roughness or no surface element height to some low or moderate level of surface roughness, such as a matte finish surface roughness, and/or moderate level of surface element height); and (ii) the area of relatively higher surface roughness, and/or higher surface element height (e.g., the circular and/or triangular outline, circular and/or triangular area) of tactile element(s) 712-1 and/or 712-2 as a minority of the total surface area of first surface 702 and include at least some portions of such circular and/or triangular outline via a surface roughness and/or surface element height that is relatively rougher (e.g., ranging from a moderate level of surface roughness and/or moderate surface element height to a high level of surface roughness and/or high surface element height) as compared with the smooth finish.

Alternatively, the surface roughness portions and/or surface element portions of tactile element(s) 712-1, 712-2 (e.g., in the form of a tringle or triangular outline) may be achieved via an area of relatively lower surface roughness and/or lower surface element height that is positioned in the visually complimentary fashion bordered by at least one area of relatively higher surface roughness. One way of achieving such an effect is to provide: (i) a majority of a total surface area of first surface 702 of substrate 700 as a relatively rough finish (e.g., ranging from some moderate level of surface roughness, such as from rougher than a matte finish surface roughness, and/or some moderate level of surface element height, to some high level of surface roughness and/or some high level of surface element height); and (ii) the area of relatively lower surface roughness and/or relatively lower surface element height (e.g., the circle, the triangle, the circular and/or triangular outline) of tactile element(s) 712-1 and/or 712-2 as a minority of the total surface area of first surface 702 and include at least some portions of such circle, triangle, circular and/or triangular outline, via a surface roughness and/or surface element height that is relatively smoother (e.g., ranging from no surface roughness and/or no surface element height to some low level of surface roughness and/or low level of surface element height) as compared with the rough finish.

A process for achieving the application of at least one tactile element 712-1, 712-2 and at least one visual element 710-1, 710-2 to substrate 700 will be discussed with reference to FIGS. 38-39, which contain schematic images of substrate 700 as it moves through the process. Steps illustrated and described are not exhaustive; other steps can be performed before, after, or between any of the described and illustrated steps. In some embodiments, the steps may be performed in a different order. Variations of the process illustrated in FIGS. 38-39 are within the scope of the present disclosure.

For purposes of this example, at least one tactile element 710-1, 710-2 is achieved via surface roughness characteristics. The process disclosed in FIGS. 38-39 is one in which at least one tactile element 712-1, 712-2 is achieved via a majority of a total surface area of first surface 702 of substrate 700 being relatively smooth and relatively higher surface roughness portions of at least one tactile element 712-1, 712-2 being disposed in a complementary fashion with respect to at least one visual element 710-1, 710-2.

At step 750, substantially all of second surface 704 of the substrate 700 is masked with an etch resistant material (e.g., with an etch resistive ink, as shown in black at step 750).

Next, at least first surface 702 of substrate 700 is exposed (e.g., dipped, sprayed, etc.) to an acid solution (etching solution) to generate a low to medium level of surface roughness on first surface 702, such as a matte finish surface roughness. The resultant matte finish is shown in grey at step 752 in which the etch resistive ink has been removed to expose the relatively smooth finish of the second surface 704 of the substrate 700 (shown in white at step 752). In some embodiments, second surface 704 of substrate 700 may not be directly masked with an etch resistant material, but instead may be protected from an etching solution in an alternative fashion. For example, step 752 may be performed on a substrate 700 defining a portion of an article (e.g., deadfront article 400), in which case any portions of the article which are not intended to be etched in step 752 may be protected from the etching solution using suitable materials or apparatuses.

In some embodiments, the etching solution used in step 752 may include hydrofluoric acid, ammonium fluoride, and a water miscible organic solvent. In some embodiments, the etching solution in step 752 may include 1-15 wt % (weight percent) hydrofluoric acid, 1-40 wt % ammonium fluoride, 0-35 wt % water miscible organic solvent, and water. In some embodiments, the etching solution in step 752 may comprise 4-10 wt % hydrofluoric acid, 5-30 wt % ammonium fluoride, 0-25 wt % water miscible organic solvent, and water. In some embodiments, the water miscible organic solvent in the etching solution in step 752 may be an alcohol, ethylene glycol, propylene glycol, glycerol, or combinations thereof. Suitable alcohols include ethanol and iso-propanol.

At step 754, an etch resistive material (e.g., etch resistive ink mask, shown in black in step 754) is applied to first surface 702 of substrate 700. In particular, the etch resistive material is applied to achieve the aforementioned tactile element(s) 712-1, 712-2 that will eventually be complementary to visual element(s) 710-1, 710-2. Again, substantially all of second surface 704 of substrate 700 may be masked or protected from an etching solution in step 754 (shown in black in step 754). Substrate 700 is again exposed (e.g., dipped, sprayed, etc.) to an acid (etching) solution that is designed to polish (reduce the roughness) of the un-masked regions of first surface 702 of substrate 700. In some embodiments, the acid solution may also reduce the thickness of substrate 700 in the un-masked regions via material removal. The resulting matte finish and tactile elements are shown in step 756 in which the etch resistive material has been removed to expose the previously masked portions of first surface 702 (shown in dark gray at step 756). Notably, the previously masked portions of first surface 702 will thus be of a higher surface roughness than the un-masked regions of the first surface 702, which have been polished and somewhat thinned. In an alternative embodiment, all portions of first surface 702 except those corresponding to the position of tactile element(s) 712-1, 712-2 that will eventually be complementary to visual element(s) 710-1, 710-2 may be masked in step 754. In such embodiments, tactile element(s) 712-1, 712-2 may lower surface roughness than un-masked regions around the tactile element(s) 712-1, 712-2.

In some embodiments, the etching solution used in step 756 may include hydrofluoric acid. In some embodiments, the etching solution used in step 756 may include 1-10 wt % hydrofluoric acid. In some embodiments, the etching solution in step 756 may include 5 wt % hydrofluoric acid.

Skilled artisans will appreciate that although use of acids for etching and/or polishing were described above as being suitable for use in applying and/or modifying the surface roughness or haze of the substrate 700, any other suitable method may be used, for example sand blasting, embossing, rolling, mechanical polishing, engraving, and/or vapor deposition (e.g., chemical or physical vapor deposition). Also, skilled artisans will appreciate that although ink printing was described as one manner of forming the etch masks and/or visual elements, any suitable alternative techniques may be employed, for example, printing, screen printing, doctor blading, gravure printing, photolithography, etc.

In an optional step, substrate 700 may also be exposed to a strengthening process, for example a thermal strengthening process or a chemical strengthening process (known in the art as an ion exchange process). In some embodiments, this optional strengthening process may be performed after step 756.

At step 758, the at least one visual element 710-1, 710-2 is disposed on second surface 704 of substrate 700. This involves disposing at least one visual element 710-1, 710-2 in such a way that it may be viewed through first surface 702 of substrate 700. This may involve ink printing, ink spraying, masking technologies, coating techniques, photolithography, etc., to provide one or more visual portions arranged into at least one of, or defining at least one of: (i) one or more areas of color, (ii) one or more lines, (iii) one or more patterns, (iv) one or more designs, (v) one or more images, (vi) one or more graphics, and (vii) one or more combinations thereof. In some embodiments, step 758 may include disposing one or more layers to form a deadfront article. For example, a semi-transparent layer (e.g., semi-transparent layer 460), a contrast layer (e.g., contrast layer 470), a color layer (e.g., color layer 650), and/or an opaque layer (e.g., opaque layer 510) may be disposed over second surface 704 of substrate 700 in step 758.

At step 760, a process for enhancing the visibility of at least one visual element 710-1, 710-2 through first surface 702 of substrate 700 may be carried out. For example, a bright (and preferably neutral) pigment layer, such as white, may be applied over visual element(s) 710-1, 710-2 on second surface 704 by way of printing, coating, spraying, etc. The bright layer is shown in step 760 as white. In some embodiments, desirable enhancement of the visibility of visual element(s) 710-1, 710-2 may be achieved when the "bright" layer is a shiny black and/or metallic coating applied over visual element(s) 710-1, 710-2 on second surface 704.

Figure 40:
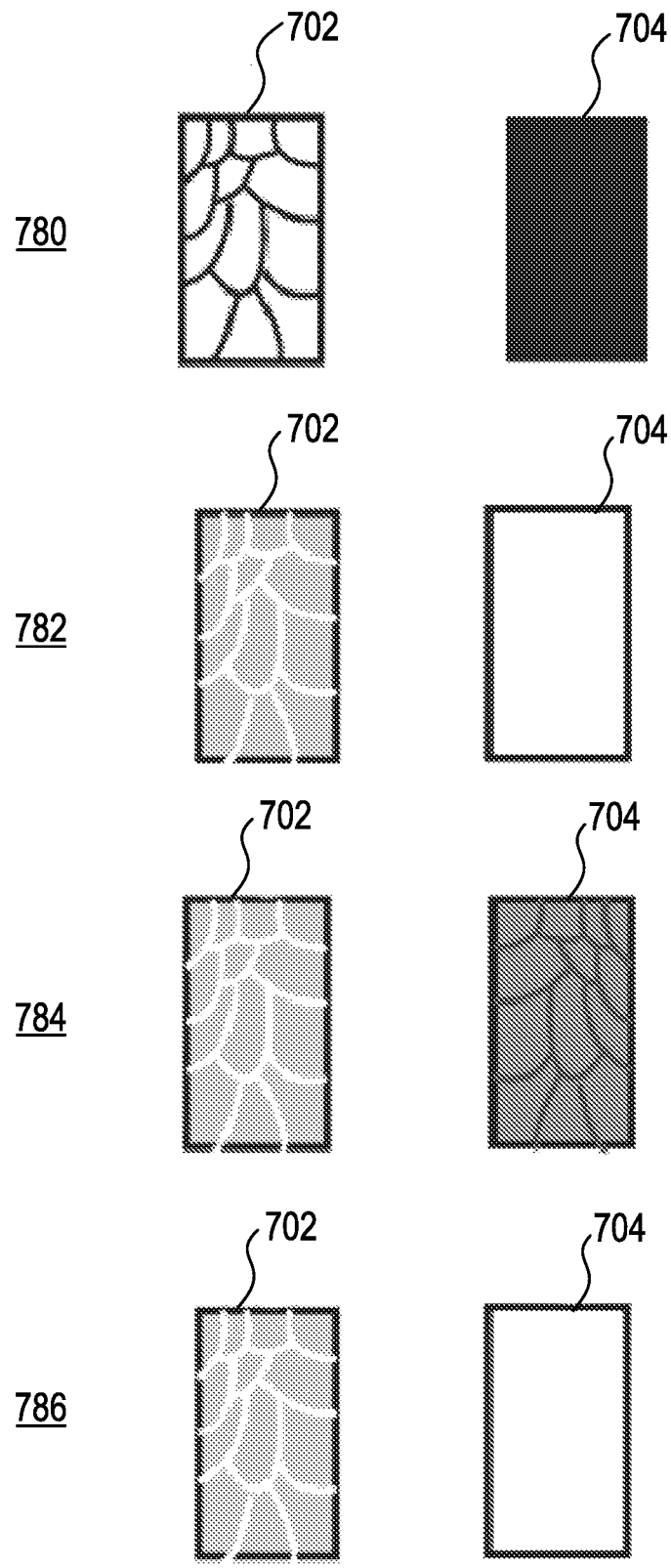
FIG. 40 depicts schematic images of a substrate as it moves through an alternative process for disposing visual and tactile features thereon.

An alternative process for achieving the application of at least one tactile element 712-1, 712-2 and at least one visual element 710-1, 710-2 on substrate 700 is illustrated in FIG. 40, which contains schematic images of substrate 700 as it moves through the alternative process. For purposes of this example, at least one tactile element 710-1, 710-2 is again achieved via surface roughness characteristics. The process disclosed in FIG. 40 is one in which at least one tactile element 712-1, 712-2 is achieved via a majority of a total surface area of first surface 702 of the substrate 700 being of a relatively high surface roughness and relatively lower surface roughness portions of at least one tactile element 712-1, 712-2 being disposed in a complementary way with respect to at least one visual element 710-1, 710-2. Steps illustrated and described are not exhaustive; other steps can be performed before, after, or between any of the described and illustrated steps. In some embodiments, the steps may be performed in a different order. Variations of the process illustrated in FIG. 40 are within the scope of the present disclosure.

At step 780, substantially all of second surface 704 of substrate 700 is masked or protected with an etch resistive material (e.g., with an etch resistive ink, as shown in black at step 780). In some embodiments, second surface 704 of substrate 700 may not be directly masked with an etch resistant material, but instead may be protected from an etching solution in alternative fashion. For example, step 780 may be performed on a substrate 700 defining a portion of an article (e.g., deadfront article 400), in which case any portions of the article which are not intended to be etched in step 780 may be protected from the etching solution using suitable materials or apparatuses.

In addition, an etch resistive material (e.g., etch resistive ink mask, as shown in black at step 780) is applied to first surface 702 of substrate 700. In particular, the etch resistive material is applied to first surface 702 to achieve the aforementioned at least one tactile element 712-1, 712-2.

Next, substrate 700 is exposed (e.g., dipped, sprayed, etc.) to an acid solution to generate a low to medium level of surface roughness on the un-masked portions of first surface 702, such as a matte finish surface roughness. Of course, alternative embodiments may employ the acid solution in such a way to produce higher levels of surface roughness. At step 782, the etch resistive material may then be removed to expose one or more areas, lines, patterns, designs, combinations thereof, etc. that are of a relatively smooth finish (shown in white at step 782) on first surface 702 among the other portions that are of a low to medium level of surface roughness (or alternatively even higher levels of roughness, as shown in grey at step 782).

In some embodiments, the etching solution used in step 782 may include hydrofluoric acid, ammonium fluoride, and a water miscible organic solvent. In some embodiments, the etching solution in step 782 may include 1-15 wt % (weight percent) hydrofluoric acid, 1-40 wt % ammonium fluoride, 0-35 wt % water miscible organic solvent, and water. In some embodiments, the etching solution in step 782 may comprise 4-10 wt % hydrofluoric acid, 5-30 wt % ammonium fluoride, 0-25 wt % water miscible organic solvent, and water. In some embodiments, the water miscible organic solvent in the etching solution in step 782 may be an alcohol, ethylene glycol, propylene glycol, glycerol, or combinations thereof. Suitable alcohols include ethanol and iso-propanol.

In some embodiments, the etching solution used in step 782 may include hydrofluoric acid. In some embodiments, the etching solution used in step 782 may include 1-10 wt % hydrofluoric acid. In some embodiments, the etching solution in step 756 may include 5 wt % hydrofluoric acid.

At step 784, at least one visual element 710-1, 710-2 is disposed on second surface 704 of substrate 700 (as shown by non-white surface 704 at step 782). As previously discussed, this involves applying visual element(s) 710-1, 710-2 in such a way that it may be viewed through first surface 702. This may involve ink printing, ink spraying, masking, coating, photolithography, etc., to provide one or more visual portions arranged into at least one of, or defining at least one of: (i) one or more areas of color, (ii) one or more lines, (iii) one or more patterns, (iv) one or more designs, (v) one or more images, (vi) one or more graphics, and (vii) one or more combinations thereof. In some embodiments, step 784 may include disposing one or more layers to form a deadfront article. For example, a semi-transparent layer (e.g., semi-transparent layer 460), a contrast layer (e.g., contrast layer 470), a color layer (e.g., color layer 650), and/or an opaque layer (e.g., opaque layer 510) may be disposed over second surface 704 of substrate 700 in step 784.

At step 786, a process for enhancing the visibility of at least one visual element 710-1, 710-2 through the first surface 702 of substrate 700 may be carried out. For example, a bright (and preferably neutral) pigment layer, such as white, is applied over at least one visual element 710-1, 710-2 on second surface 704 by way of printing, coating, spraying, etc., as shown by white on second surface 704 at step 786. As mentioned above, desirable enhancement of the visibility of at least one visual element 710-1, 710-2 may alternatively be achieved when the "bright" layer is a shiny black and/or metallic coating applied over at least one visual element 710-1, 710-2 on second surface 704.

Skilled artisans will appreciate that although use of acids for etching and/or polishing were described above as being suitable for use in applying and/or modifying the surface roughness or haze of the substrate 700, any other suitable method may be used, for example sand blasting, embossing, rolling, mechanical polishing, engraving, and/or vapor deposition (e.g., chemical or physical vapor deposition). Also, skilled artisans will appreciate that although ink printing was described as one manner of forming the etch masks and/or visual elements, any suitable alternative techniques may be employed, for example, printing, screen printing, doctor blading, gravure printing, photolithography, etc.

The processes described above with reference to FIGS. 38-40 result in two different levels of surface roughness in order to achieve at least one tactile element 712-1, 712-2. Skilled artisans will appreciate, however, that the noted steps in the process may be altered (e.g., by adding steps of masking, etching, polishing, and/or other techniques) in order to achieve three or more different levels of surface roughness, which may enhance the visual and/or tactile effects of tactile element(s) 712-1, 712-2.

Further, skilled artisans will appreciate that the processes described above with reference to FIGS. 38-40 may be modified to achieve an alternative set of characteristics for at least one tactile element 712-1, 712-2. For example, at least one tactile element 712-1, 712-2 may be formed from at least two differing levels of surface roughness and/or surface element heights, neither of which is the unaltered, original, smooth surface finish of substrate 700.

For example, step 780 may include the aforementioned printing of substantially all of second surface 704 of substrate 700 and the etch resistive material (mask). However, prior to applying the etch resistive material to first surface 702, substrate 700 may be exposed (e.g., dipped, sprayed, etc.) to an acid solution to generate some level of surface roughness on first surface 702, such as a matte finish surface roughness. Thereafter, the etch resistive material (mask) is applied to first surface 702 of substrate 700 (i.e., over the previously formed matte finish) to achieve the aforementioned at least one tactile element 712-1, 712-2.

Next, substrate 700 is again exposed (e.g., dipped, sprayed, etc.) to an acid solution to generate a further level of surface roughness on the un-masked portions of first surface 702, which is rougher than the previously produced matte finish surface roughness. At step 782, the etch resistive material may then be removed from first surface 702 to expose one or more areas, lines, patterns, designs, combinations thereof, etc. that are of the matte finish surface roughness (represented by the lines in white at steps 782, 784 in FIG. 40) among the other portions that are of a higher level of surface roughness (represented by the grey at steps 782, 784 in FIG. 40).

Next, the remainder of the process previously discussed in connection with steps 784 and 786 of FIG. 40 may be carried out, which would produce at least one tactile element 712-1, 712-2 formed from at least two differing levels of surface roughness, neither of which is the unaltered, original, smooth surface finish of substrate 700. While this process results in two different levels of surface roughness in order to achieve at least one tactile element 712-1, 712-2, skilled artisans will appreciate that the steps in the process may be altered (e.g., by adding steps of masking, etching, polishing, and/or other techniques) in order to achieve three or more different levels of surface roughness.

Figure 41:
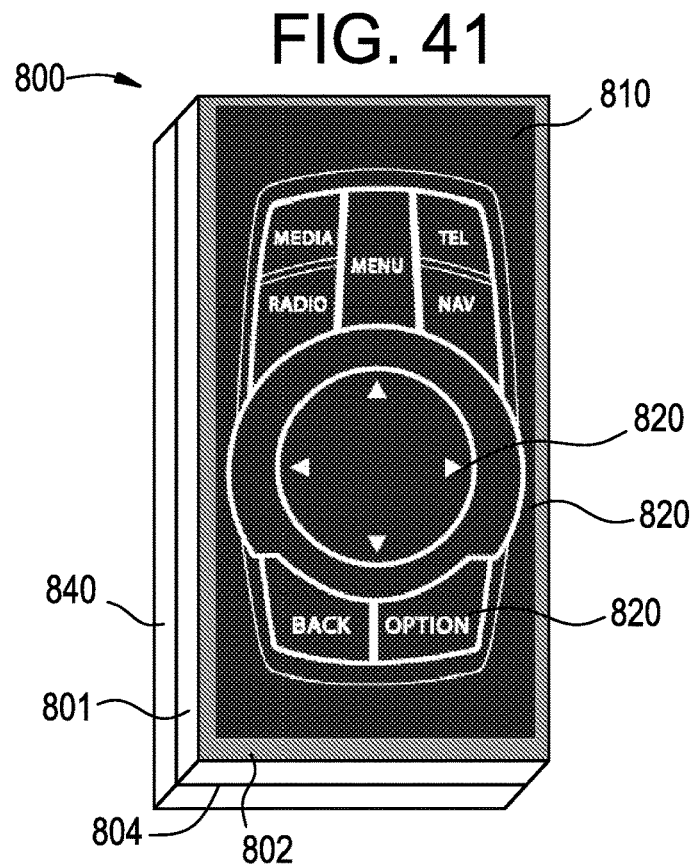
FIG. 41 depicts a backlit deadfront article with a visual element visible through a surface of the article.
Figure 42:
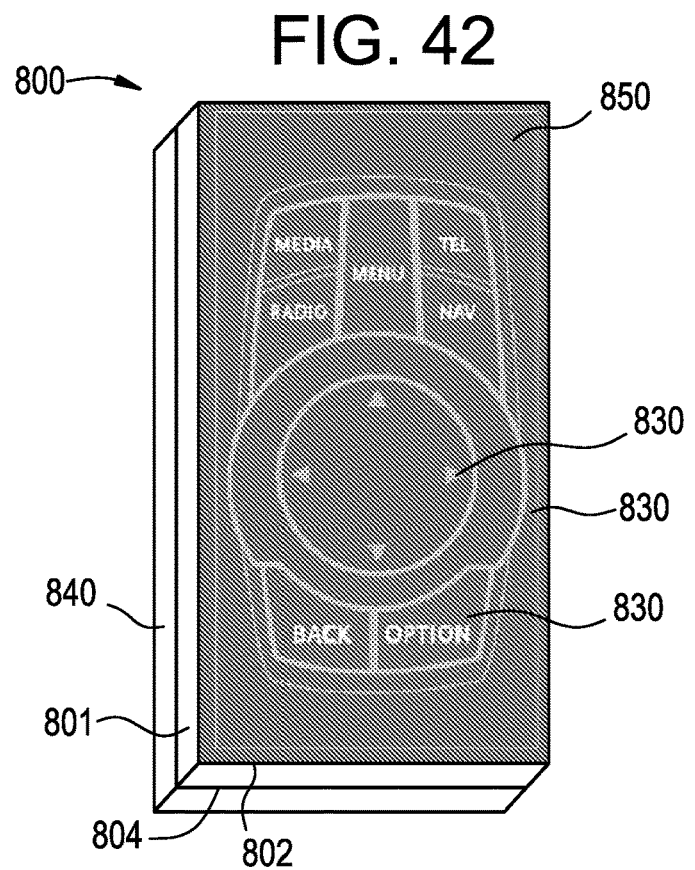
FIG. 42 depicts tactile elements on a surface of a deadfront article when the article is not backlit.

FIGS. 41 and 42 illustrate a deadfront article 800 according to some embodiments. FIG. 41 illustrates article 800 when it is backlit with a visual element 810 of article 800 shown. FIG. 42 illustrates article 800 when it is not backlit with tactile elements 830 of article 800 shown.

Deadfront article 800 includes a substrate 801. Substrate 801 may be the same as or similar to any substrate discussed herein and includes a first surface 802 a second surface 804 opposite first surface 802. A visual element 810 may be disposed on second surface 804 of substrate 801 and/or within substrate 801 such that visual element 810 may be viewed through first surface 802. Visual element 810 may include one or more graphics 820 that may be viewed through first surface 802 when article 800 is backlit (see FIG. 41). In some embodiments, one or more graphics 820 includes or is an icon. In some embodiments, visual element 810 may include a plurality of separate visual elements including one or more graphics. For example, visual element 810 may include a plurality of printed, coated, sprayed, etc. layers or materials including one or more graphics.

As used herein, an "icon" is an area, line, shape, pattern, design, image, symbol, letter, number, logo, or combination thereof that represents one or more functionalities of a device. When actuated by a user (e.g., via touch) an icon will produce a functional result represented by the icon. For example, an on/off icon will power a device on or off. As another example, a "volume" icon will cause a device to produce more or less sound. An icon may also be called a button.

Article 800 also includes at least one tactile element 830 formed on first surface 802 of substrate 801. As discussed herein, tactile element(s) 830 may include one or more surface roughness portions, with at least one of the one or more surface roughness portions positioned on first surface 802 in a complimentary fashion to all or a portion of visual element 810. For example, tactile element(s) 830 may include one or more surface roughness portions, with at least one of the one or more surface roughness portions positioned on first surface 802 in a complimentary fashion to a graphic 820. Tactile element(s) 830 create a haptic feel for a user touching first surface 802 while preserving the appearance of a deadfronted material imagined on first surface 802 (e.g., carbon fiber, stainless steel, wood, etc.) when article 800 is not backlit. In some embodiments, tactile element(s) 830 may be faintly visible on first surface 802.

As used herein, a first object (e.g., tactile element) "formed on" a surface of a second object (e.g., substrate) means that the first object is directly formed on the surface of the second object. A first object formed on a surface of a second object may be formed by depositing material on the surface, removing material from the surface, and/or chemically altering one or more surface properties of the surface. Suitable methods for forming a first object on the surface of a second object include, but are not limited to, etching (e.g., etching with an acid), polishing, sand blasting, engraving, embossing, rolling, and/or vapor deposition (e.g., chemical or physical vapor deposition). Forming a first object on the surface of a second object may change one or more properties of the surface, including, but not limited to, surface geometry, surface roughness, haze, and reflectivity. In some embodiments, tactile element(s) 830 may be etched surface portions formed by, for example, an etching process described in reference to FIGS. 38-39 or FIG. 40.

Deadfront article 800 also includes a deadfront assembly 840 disposed on second surface 804. Deadfront assembly 840 may include any layers descried herein for forming a deadfront article. For example, deadfront assembly 840 may include a semi-transparent layer (e.g., semi-transparent layer 460), a contrast layer (e.g., contrast layer 470), a color layer (e.g., color layer 650), and/or an opaque layer (e.g., opaque layer 510). As an example, FIG. 42 illustrates a semi-transparent layer 850, which is disposed on second surface 804, visible through first surface 802 when article is not backlit.

As another example, deadfront assembly 840 may include a high optical density layer (e.g., opaque layer 510) disposed onto at least a portion of a contrast layer (e.g., contrast layer 470) such that the contrast layer is located between the high optical density layer and the semi-transparent layer. In such embodiments, the high optical density layer may at least in part define one or more graphics 820. In some embodiments, deadfront article 800 may include a touch panel (e.g., touch panel 660) located behind visual element 810, the touch panel configured to respond to a touch by a user (e.g., a touch of one or more graphics 820). In such embodiments, the touch panel may be configured to respond to a user's touch of graphic 820, which may be an icon.

In some embodiments, the portion of first surface 802 occupied by tactile element(s) 830 may be relatively rougher (i.e., may have a higher surface roughness) than all or a portion of the remainder of first surface 802. In such embodiments, tactile element(s) 830 may have a Ra surface roughness of greater than about 80 nm.

In some embodiments, the portion of first surface 802 occupied by tactile element(s) 830 may be relatively smoother (i.e., may have a lower surface roughness) than all or a portion of the remainder of first surface 802. In such embodiments, all or a portion of first surface 802 around tactile element(s) 830 may have a Ra surface roughness of greater than about 80 nm.

In some embodiments, deadfront article 800 may be made using a processing including one or more processes described herein in reference to FIGS. 38-40. In such embodiments, a method of forming tactile element(s) 830 on deadfront article 800 includes forming at least one tactile element 830 on first surface 802 of substrate 801 in a complimentary fashion to a graphic 820 of visual element 810 disposed on second surface 804 of substrate 801 opposite first surface 802 and/or within substrate 801 such that the graphic 820 may be viewed through first surface 802.

Aspect (1) of this disclosure pertains to a deadfront article comprising: a substrate comprising: a first surface; and a second surface opposite the first surface; a visual element disposed on the second surface of the substrate and/or within the substrate such that the visual element may be viewed through the first surface, the visual element comprising a graphic that may be viewed through the first surface; at least one tactile element formed on the first surface of the substrate, the at least one tactile element comprising one or more surface roughness portions, wherein at least one of the one or more surface roughness portions is positioned on the first surface of the substrate in a complimentary fashion to the graphic; a semi-transparent layer disposed on at least a first portion of the second surface of the substrate, the semi-transparent layer having a region of a solid color or of a design of two or more colors; and a contrast layer disposed on at least a portion of the region, the contrast layer configured to enhance visibility of the color of the region or to enhance contrast between the colors of the design of the region on the portion of the region on which the contrast layer is disposed.

Aspect (2) of this disclosure pertains to the deadfront article of Aspect (1), wherein the one or more surface roughness portions are defined by one of: (i) an area of relatively higher surface roughness bordered by at least one area of relatively lower surface roughness, and (ii) an area of relatively lower surface roughness bordered by at least one area of relatively higher surface roughness.

Aspect (3) of this disclosure pertains to the deadfront article of Aspect (1) or Aspect (2), wherein the graphic comprises an icon.

Aspect (4) of this disclosure pertains to the deadfront article of any one of Aspects (1) through (3), wherein the one or more surface roughness portions comprises an etched portion of the first surface of the substrate.

Aspect (5) of this disclosure pertains to the deadfront article of any one of Aspects (1) through (4), wherein: a majority of a total surface area of the first surface of the substrate comprises a first surface roughness; and the one or more surface roughness portions of the tactile element cover a minority of the total surface area of the first surface and comprise a second surface roughness, which is different from the first surface roughness.

Aspect (6) of this disclosure pertains to the deadfront article of Aspect (5), wherein the second surface roughness is relatively rougher than the first surface roughness.

Aspect (7) of this disclosure pertains to the deadfront article of Aspect (6), wherein the second surface roughness comprises a $R_a$ surface roughness of greater than about 80 nm.

Aspect (8) of this disclosure pertains to the deadfront article of Aspect (5), wherein the first surface roughness is relatively rougher than the second surface roughness.

Aspect (9) of this disclosure pertains to the deadfront article of Aspect (8), wherein the first surface roughness comprises a $R_a$ surface roughness of greater than about 80 nm.

Aspect (10) of this disclosure pertains to the deadfront article of any one of Aspects (1) through (9), wherein the substrate comprises a material selected from the group consisting of: a glass, a glass ceramic, and a polymer.

Aspect (11) of this disclosure pertains to the deadfront article of any one of Aspects (1) through (10), wherein the substrate comprises strengthened glass.

Aspect (12) of this disclosure pertains to the deadfront article of any one of Aspects (1) through (11), further comprising a high optical density layer disposed onto at least a portion of the contrast layer such that the contrast layer is located between the high optical density layer and the semi-transparent layer.

Aspect (13) of this disclosure pertains to the deadfront article of Aspect (11), wherein the high optical density layer at least in part defines the graphic.

Aspect (14) of this disclosure pertains to the deadfront article of Aspect (13), further comprising a color layer disposed in regions of the visual element such that, in at least a portion of the visual element defined by the high optical density layer, the contrast layer is located between the semi-transparent layer and the color layer.

Aspect (15) of this disclosure pertains to the deadfront article of any one of Aspects (1) through (14), wherein the region of the semi-transparent layer has a design of two or more colors, the design comprising at least one of a leather grain pattern, a wood grain pattern, a fabric pattern, a brushed metal finish pattern, and a logo.

Aspect (16) of this disclosure pertains to the deadfront article of any one of Aspects (1) through (15), further comprising a touch panel located behind the visual element, the touch panel configured to respond to a touch by a user.

Aspect (17) pertains to an automobile interior comprising: a deadfront article comprising: a substrate comprising: a first surface; and a second surface opposite the first surface; a visual element disposed on the second surface of the substrate and/or within the substrate such that the visual element may be viewed through the first surface, the visual element comprising a graphic that may be viewed through the first surface; at least one tactile element formed on the first surface of the substrate, the at least one tactile element comprising one or more surface roughness portions, wherein at least one of the one or more surface roughness portions is positioned on the first surface of the substrate in a complimentary fashion to the graphic; a semi-transparent layer disposed on a second surface of the substrate layer; a contrast layer disposed on at least a portion of the semi-transparent layer; and a high optical density layer disposed on at least a portion of the contrast layer, the high optical density layer at least in part defining the graphic; and a touch panel located behind the visual element, the touch panel configured to respond to a touch by a user.

Aspect (18) pertains to the automobile interior of Aspect (17), wherein the graphic is an icon and wherein the touch panel is configured to respond to a user's touch of the icon.

Aspect (19) pertains to the automobile interior of Aspect (17) or Aspect (18), wherein the semi-transparent layer has a region of a solid color or of a design of two or more colors, the design comprising at least one of a leather grain pattern, a wood grain pattern, a fabric pattern, a brushed metal finish pattern, and a logo.

Aspect (20) pertains to the automobile interior of any one of Aspects (17) through (19), wherein the high optical density layer disposed onto at least a portion of the contrast layer such that the contrast layer is located between the high optical density layer and the semi-transparent layer.

Aspect (21) pertains to the automobile interior of Aspect (20), further comprising a color layer disposed in regions of the visual element such that, in at least a portion of the visual element defined by the high optical density layer, the contrast layer is located between the semi-transparent layer and the color layer.

Aspect (22) pertains to a method of forming a tactile element on a deadfront article, the method comprising: forming at least one tactile element on a first surface of a substrate in a complimentary fashion to a graphic defined by a visual element disposed on a second surface of the substrate opposite the first surface and/or within the substrate such that the graphic may be viewed through the first surface, wherein the at least one tactile element is formed by a process comprising at least one of etching, sandblasting, polishing, and engraving.

Aspect (23) pertains to the method of forming a tactile element on a deadfront article of Aspect (22), wherein the at least one tactile element is formed by an etching process.

Aspect (24) pertains to the method of forming a tactile element on a deadfront article of Aspect (23), wherein the etching process comprises: etching the first surface with a first etching solution; disposing a mask over the first surface after etching the first surface with the first etching solution, the mask comprising a shape corresponding to the shape of the graphic; and etching an unmasked region of the first surface with a second etching solution.

Aspect (25) pertains to the method of forming a tactile element on a deadfront article of Aspect (24), wherein the first etching solution comprises hydrofluoric acid, ammonium fluoride, and a water miscible organic solvent, and wherein the second etching solution comprises hydrofluoric acid.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

The term "wherein" is used as an open-ended transitional phrase, to introduce a recitation of a series of characteristics of the structure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, ranges, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A deadfront article comprising:
   a substrate comprising:
     a first surface; and
     a second surface opposite the first surface;
   a visual element disposed on the second surface of the substrate and/or within the substrate such that the visual element may be viewed through the first surface, the visual element comprising a graphic that may be viewed through the first surface;
   at least one tactile element formed on the first surface of the substrate, the at least one tactile element comprising one or more surface roughness portions, wherein at least one of the one or more surface roughness portions is positioned on the first surface of the substrate in a complimentary fashion to the graphic;
   a semi-transparent layer disposed on at least a first portion of the second surface of the substrate, the semi-transparent layer having a region of a solid color or of a design of two or more colors; and
   a contrast layer disposed on at least a portion of the region, the contrast layer configured to enhance visibility of the color of the region or to enhance contrast between the colors of the design of the region on the portion of the region on which the contrast layer is disposed.

2. The deadfront article of claim 1, wherein the one or more surface roughness portions are defined by one of: (i) an area of relatively higher surface roughness bordered by at least one area of relatively lower surface roughness, and (ii) an area of relatively lower surface roughness bordered by at least one area of relatively higher surface roughness.

3. The deadfront article of claim 1, wherein the graphic comprises an icon.

4. The deadfront article of claim 1, wherein the one or more surface roughness portions comprises an etched portion of the first surface of the substrate.

5. The deadfront article of claim 1, wherein: a majority of a total surface area of the first surface of the substrate comprises a first surface roughness; and
the one or more surface roughness portions of the tactile element cover a minority of the total surface area of the first surface and comprise a second surface roughness, which is different from the first surface roughness.

6. The deadfront article of claim 5, wherein the second surface roughness is relatively rougher than the first surface roughness.

7. The deadfront article of claim 6, wherein the second surface roughness comprises a $R_a$ surface roughness of greater than about 80 nm.

8. The deadfront article of claim 5, wherein the first surface roughness is relatively rougher than the second surface roughness.

9. The deadfront article of claim 8, wherein the first surface roughness comprises a $R_a$ surface roughness of greater than about 80 nm.

10. The deadfront article of claim 1, wherein the substrate comprises a material selected from the group consisting of: a glass, a glass ceramic, and a polymer.

11. The deadfront article of claim 1, wherein the substrate comprises strengthened glass.

12. The deadfront article of claim 1, comprising a high optical density layer disposed onto at least a portion of the contrast layer such that the contrast layer is located between the high optical density layer and the semi-transparent layer.

13. The deadfront article according to claim 12, wherein the high optical density layer at least in part defines the graphic.

14. The deadfront article of claim 13, further comprising a color layer disposed in regions of the visual element such that, in at least a portion of the visual element defined by the high optical density layer, the contrast layer is located between the semi-transparent layer and the color layer.

15. The deadfront article of claim 1, further comprising a touch panel located behind the visual element, the touch panel configured to respond to a touch by a user.

16. An automobile interior comprising:
a deadfront article comprising:
a substrate comprising:
a first surface; and
a second surface opposite the first surface;
a visual element disposed on the second surface of the substrate and/or within the substrate such that the visual element may be viewed through the first surface, the visual element comprising a graphic that may be viewed through the first surface;
at least one tactile element formed on the first surface of the substrate, the at least one tactile element comprising one or more surface roughness portions, wherein at least one of the one or more surface roughness portions is positioned on the first surface of the substrate in a complimentary fashion to the graphic;
a semi-transparent layer disposed on a second surface of the substrate layer;
a contrast layer disposed on at least a portion of the semi-transparent layer; and
a high optical density layer disposed on at least a portion of the contrast layer, the high optical density layer at least in part defining the graphic; and
a touch panel located behind the visual element, the touch panel configured to respond to a touch by a user.

17. The automobile interior of claim 16 wherein the graphic is an icon and wherein the touch panel is configured to respond to a user's touch of the icon.

18. The automobile interior article of claim 16, wherein the high optical density layer disposed onto at least a portion of the contrast layer such that the contrast layer is located between the high optical density layer and the semi-transparent layer.

19. The automobile interior of claim 18, further comprising a color layer disposed in regions of the visual element such that, in at least a portion of the visual element defined by the high optical density layer, the contrast layer is located between the semi-transparent layer and the color layer.

* * * * *

UNITED STATES PATENT AND TRADEMARK OFFICE
CERTIFICATE OF CORRECTION

PATENT NO. : 11,459,268 B2
APPLICATION NO. : 16/646732
DATED : October 4, 2022
INVENTOR(S) : Matthew Wade Fenton et al.

It is certified that error appears in the above-identified patent and that said Letters Patent is hereby corrected as shown below:

On the Title Page

On the page 3, item (56), in Column 1, under "U.S. Patent Documents", Line 38, delete "Parton" and insert -- Barton --.

On the page 6, item (56), in Column 1, under "Other Publications", Line 11, delete "Faade" and insert -- Facade --.

On the page 6, item (56), in Column 1, under "Other Publications", Line 12, delete "Faade""

On the page 6, item (56), in Column 2, under "Other Publications", Line 11, delete ""Optical" and insert -- Façade" --.

On the page 6, item (56), in Column 2, under "Other Publications", Line 12, after "2007." insert -- pages 123-146. --.

On the page 6, item (56), in Column 2, under "Other Publications", Line 28, delete "Science, Science 224," and insert -- Science 224, --.

On the page 6, item (56), in Column 2, under "Other Publications", Line 30, delete ""Pegaton" and insert -- "Pegatron --.

On the page 6, item (56), in Column 2, under "Other Publications", Line 31, delete "Worlds," and insert -- World; --.

On the page 6, item (56), in Column 2, under "Other Publications", Line 52, delete "anoindentation" and insert -- nanoindentation --.

Signed and Sealed this
Sixth Day of February, 2024

Katherine Kelly Vidal
*Director of the United States Patent and Trademark Office*